(12) United States Patent
Baijal et al.

(10) Patent No.: US 11,676,016 B2
(45) Date of Patent: Jun. 13, 2023

(54) SELECTING ARTIFICIAL INTELLIGENCE MODEL BASED ON INPUT DATA

(71) Applicant: SAMSUNG ELECTRONICS CO., LTD., Suwon-si (KR)

(72) Inventors: Anant Baijal, Suwon-si (KR); Vivek Agarwal, Suwon-si (KR); Jayoon Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 16/899,841

(22) Filed: Jun. 12, 2020

(65) Prior Publication Data

US 2020/0394451 A1    Dec. 17, 2020

(30) Foreign Application Priority Data

Jun. 12, 2019    (KR) .................. 10-2019-0069556

(51) Int. Cl.
  *G06N 3/08*       (2023.01)
  *G06N 20/20*      (2019.01)
  *G06F 18/20*      (2023.01)
  *G06F 18/2415*    (2023.01)
  *G06F 18/2431*    (2023.01)

(52) U.S. Cl.
  CPC ........... *G06N 3/08* (2013.01); *G06F 18/2415* (2023.01); *G06F 18/2431* (2023.01); *G06F 18/285* (2023.01); *G06N 20/20* (2019.01)

(58) Field of Classification Search
  CPC .. G06K 9/6227; G06K 9/6277; G06K 9/6256; G06K 9/628; G06K 9/6267; G06N 20/00; G06N 3/08; G06N 3/0454
  See application file for complete search history.

(56) References Cited

U.S. PATENT DOCUMENTS

| 8,244,652 | B2 | 8/2012 | Menahem et al. | |
| 8,595,153 | B2 | 11/2013 | Drucker et al. | |
| 9,171,259 | B1 | 10/2015 | Laxmanan et al. | |
| 9,785,866 | B2 | 10/2017 | Hua et al. | |
| 10,169,683 | B2 | 1/2019 | Burgos et al. | |
| 10,733,530 | B2 * | 8/2020 | Jordan | H04L 43/16 |
| 2009/0316983 | A1 * | 12/2009 | Han | G06V 40/23 382/159 |
| 2012/0027249 | A1 * | 2/2012 | Brown | G06V 20/52 382/103 |

(Continued)

FOREIGN PATENT DOCUMENTS

WO    2019041752 A1    3/2019

OTHER PUBLICATIONS

International Search Report and Written Opinion (PCT/ISA/210 and PCT/ISA/237), dated Sep. 25, 2020 issued by International Searching Authority in International Application No. PCT/KR2020/007607.

(Continued)

*Primary Examiner* — Margaret G Mastrodonato

(74) *Attorney, Agent, or Firm* — Sughrue Mion, PLLC

(57) ABSTRACT

A method of selecting an artificial intelligence (AI) model based on input data to select an AI model capable of correctly obtaining a result corresponding to data to be classified, e.g., a classification result indicating one of at least one class, from among a plurality of AI models, and a display device for performing the method.

19 Claims, 21 Drawing Sheets

(56) References Cited

U.S. PATENT DOCUMENTS

| | | | |
|---|---|---|---|
| 2014/0029840 A1* | 1/2014 | Jebara | G06K 9/6256 |
| | | | 382/159 |
| 2014/0161354 A1* | 6/2014 | Curcio | G06K 9/629 |
| | | | 382/190 |
| 2016/0335432 A1 | 11/2016 | Vatamanu et al. | |
| 2017/0061329 A1 | 5/2017 | Kobayashi et al. | |
| 2017/0278013 A1 | 9/2017 | Yu et al. | |
| 2018/0075368 A1 | 3/2018 | Brennan et al. | |
| 2018/0157965 A1 | 6/2018 | Sun et al. | |
| 2018/0225391 A1 | 8/2018 | Sali et al. | |
| 2019/0102700 A1 | 4/2019 | Babu et al. | |
| 2019/0156247 A1 | 5/2019 | Faulhaber, Jr. et al. | |

OTHER PUBLICATIONS

Communication dated Nov. 13, 2020, issued by the European Patent Office in European Application No. 20179542.4.

\* cited by examiner

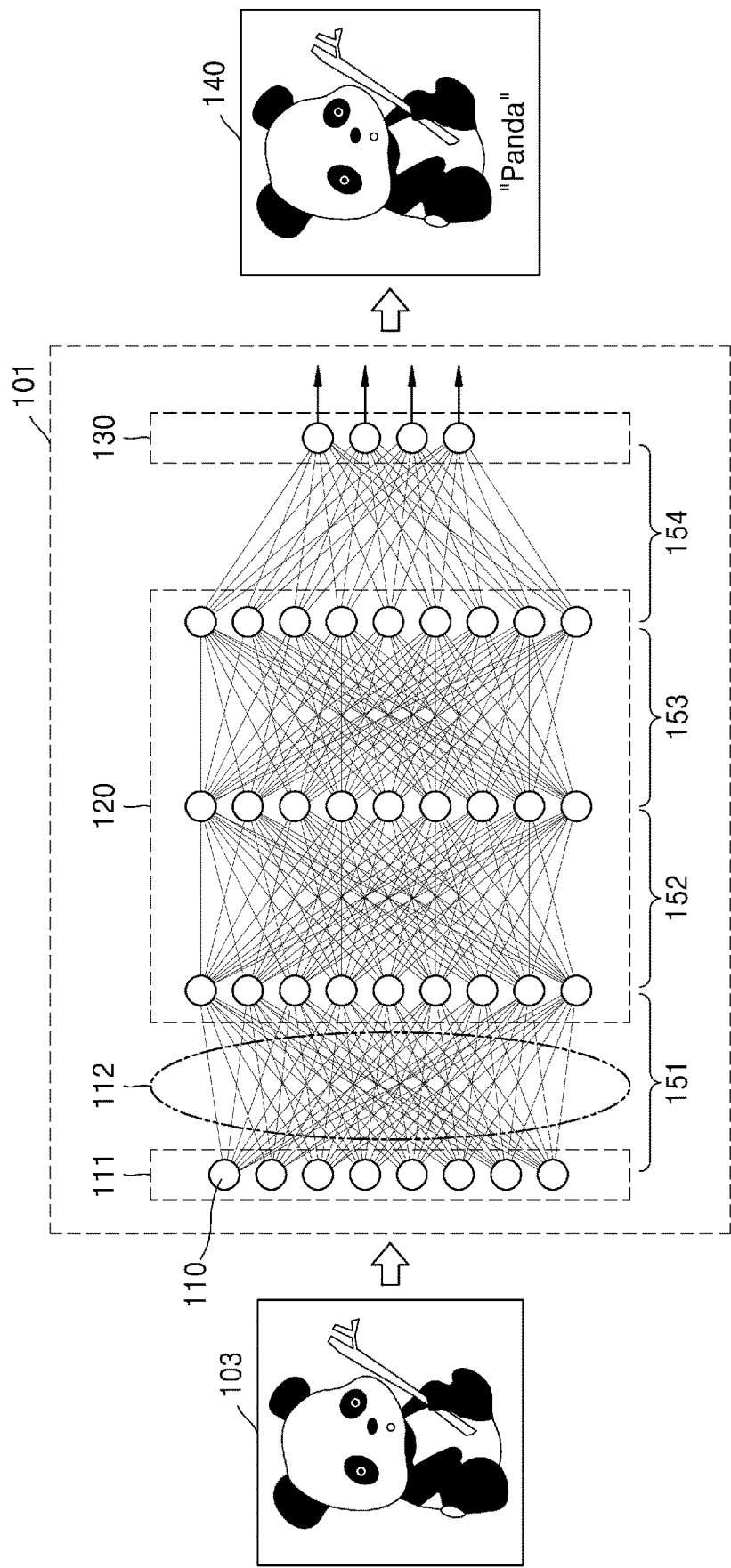

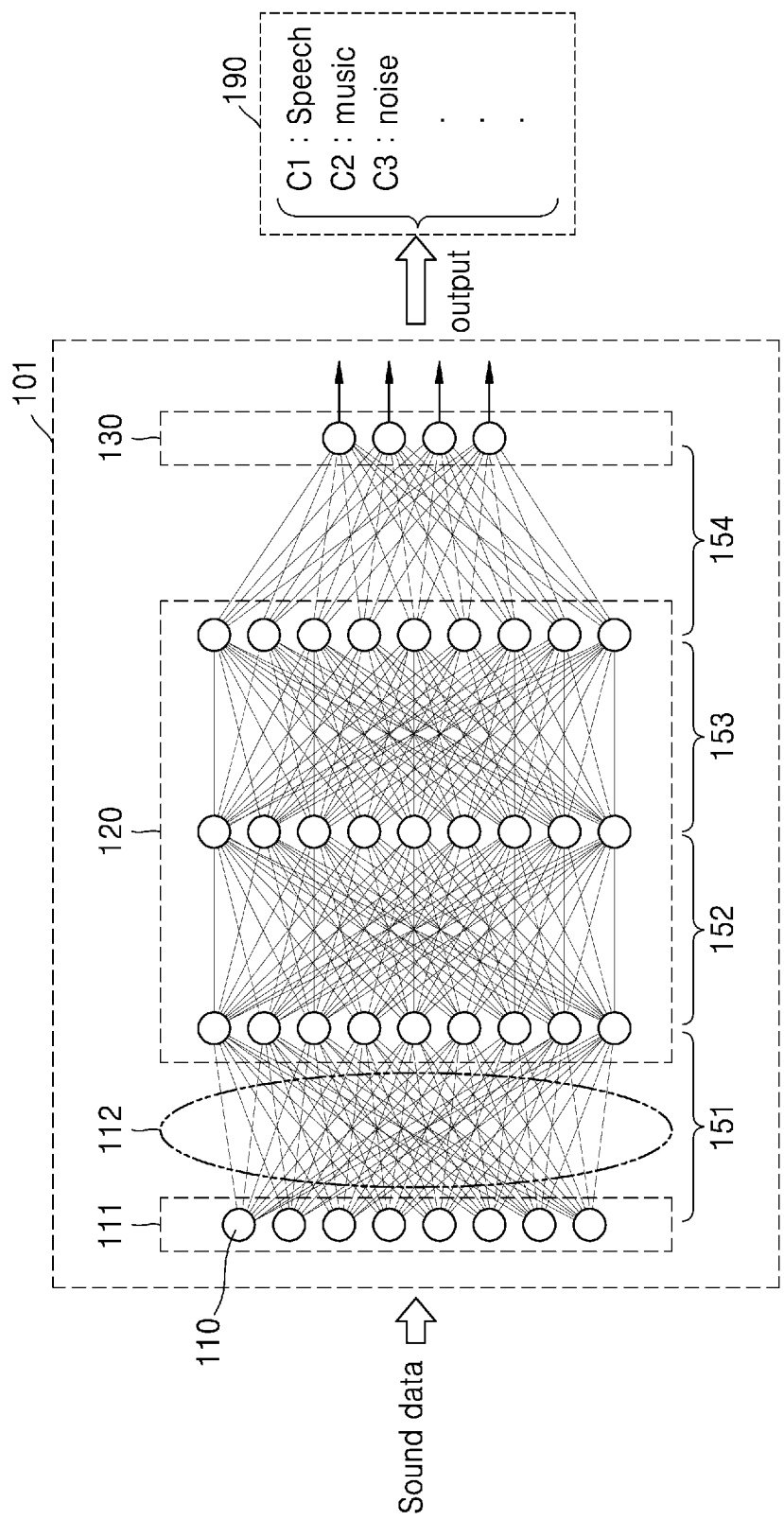

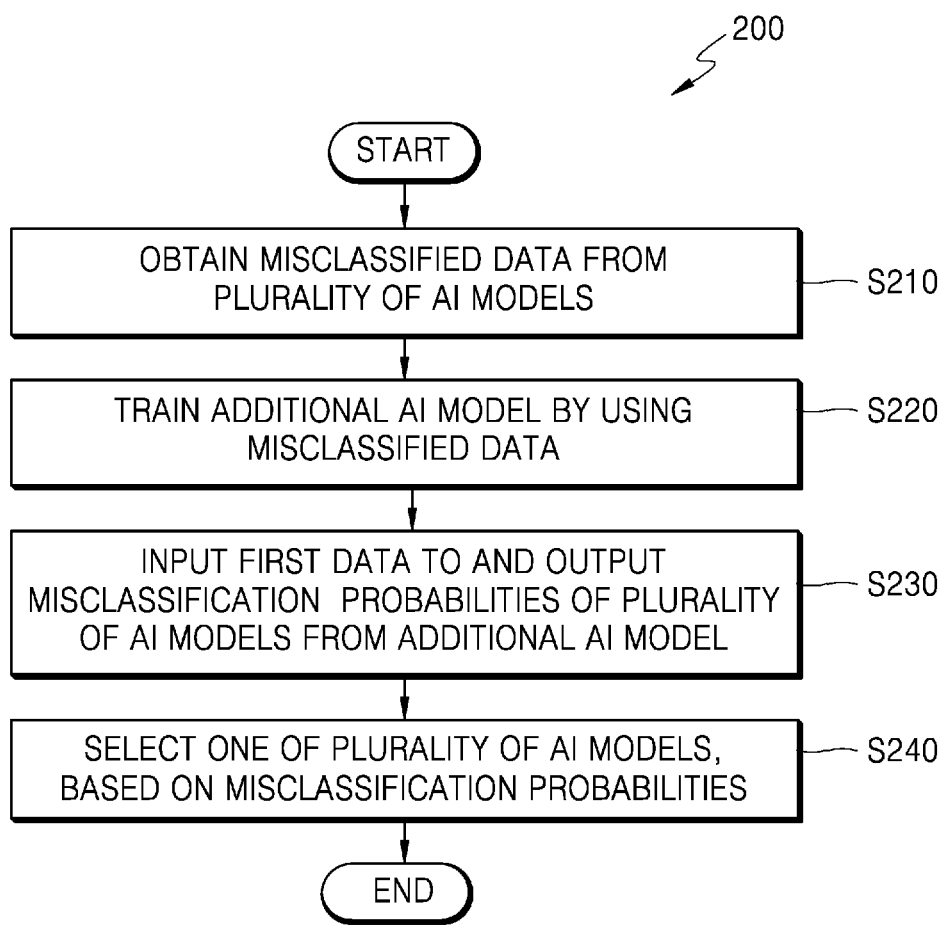

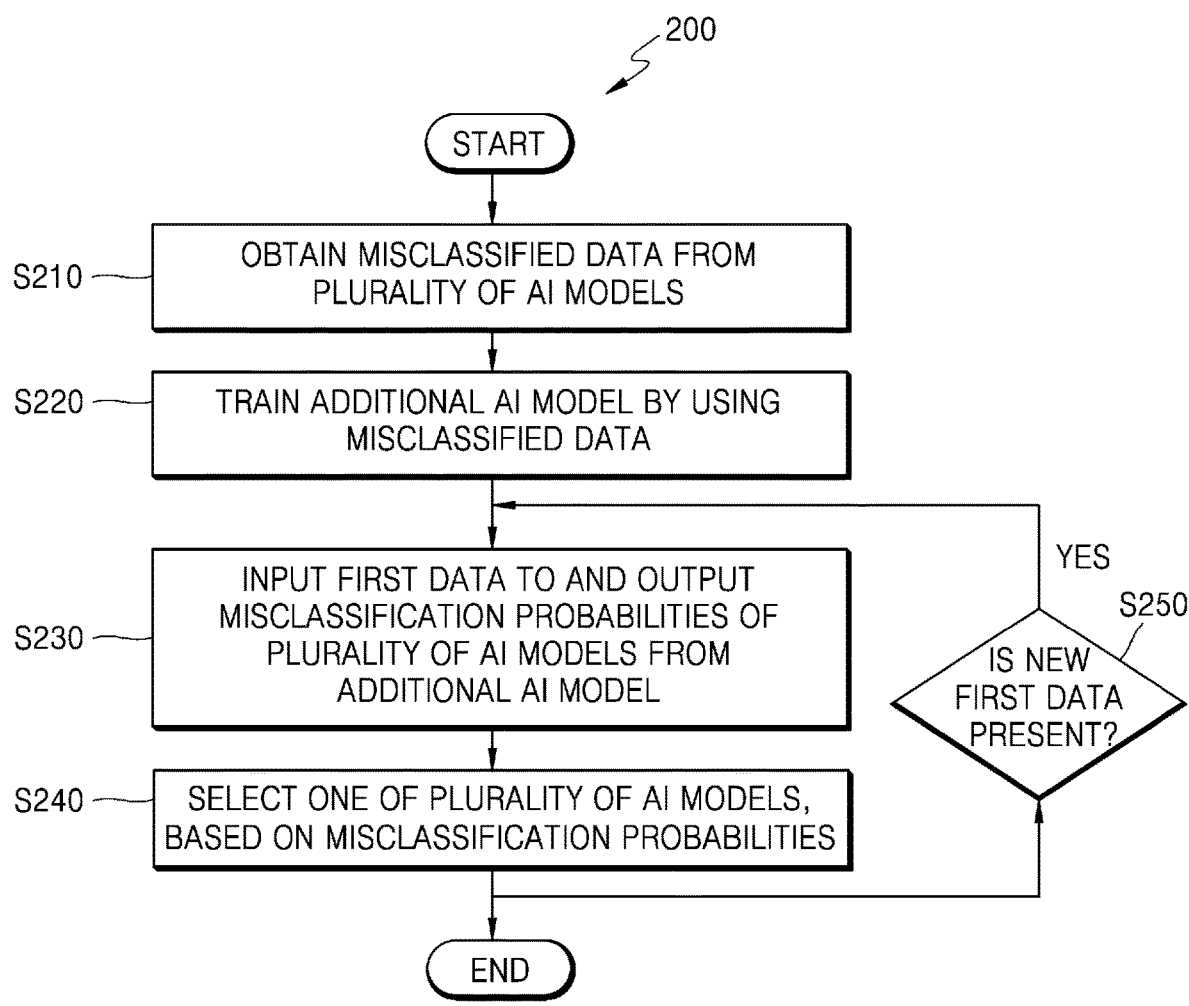

SELECTING ARTIFICIAL INTELLIGENCE MODEL BASED ON INPUT DATA

CROSS-REFERENCE TO RELATED APPLICATION

This application is based on and claims priority under 35 U.S.C. § 119 to Korean Patent Application No. 10-2019-0069556, filed on Jun. 12, 2019, in the Korean Intellectual Property Office, the disclosure of which is incorporated by reference herein in its entirety.

BACKGROUND

1. Field

The disclosure relates to a method of selecting an artificial intelligence (AI) model based on input data, and a display device for performing the method.

More particularly, the disclosure relates to a method of selecting an AI model based on input data to output a result of the selected AI model processing the input data, and a display device for performing the method.

2. Description of Related Art

An artificial intelligence (AI) system is a system in which a machine is trained, makes decisions, obtains processing results, or performs desired operations in an autonomous manner.

AI technology includes machine learning such as deep learning, and element technologies using machine learning. The AI technology is widely according to technical fields such as linguistic understanding, visual understanding, inference/prediction, knowledge representation, and motion control.

For example, the AI technology may be according to technical fields such as visual understanding and inference/prediction. Specifically, a technology for analyzing and classifying input data may be implemented using AI technology. That is, a method and apparatus may be implemented for obtaining a result by analyzing and/or classifying input data.

In the following description, from among various AI technologies, an example of AI technology for analyzing input data (e.g., an image), recognizing an object included in the input data, classifying the recognized object into at least one class, and outputting the classification result will be described.

Such an AI technology may be implemented using one or more algorithms. Herein, an algorithm or a set of algorithms for implementing AI technology may be called a neural network. The neural network may be provided input data, perform calculations for analyzation and classification of the input data, and output result data that is a result of analyzing and classifying the input data. The neural network may be trained to output optimal result data corresponding to the input data. Herein, 'training' may refer to inputting various data to the neural network and training the neural network to autonomously find or learn how to optimally analyze the input data, optimally classify the input data, and/or a method of extracting, from the input data, features required to generate result data.

A set of algorithms for generating output data corresponding to input data through the above-described neural network, software for executing the set of algorithms, and/or hardware for executing the set of algorithms may be called an 'AI model.'

A wide variety of AI models may be implemented. Specifically, a plurality of AI models for receiving an input image, analyzing the input image, and classifying an object included in the image into at least one class may be present.

Herein, when the plurality of AI models generate output data corresponding to input data, the output data of the plurality of AI models may have different accuracies. The plurality of AI models may output different results depending on the input data. That is, when the same input data is input, result data of a first AI model may have a correct value, whereas result data of a second AI model may have an incorrect value.

When multiple AI models exist, it may be preferable to select which of the various AI models is to be used to obtain a desirable processing result corresponding to input data. Furthermore, additional implementations should provide a method and apparatus for selecting an AI model capable of increasing processing accuracy of input data, from among various AI models.

SUMMARY

Provided are a method of selecting an optimal artificial intelligence (AI) model for performing processing on input data from among a plurality of AI models, and a display device for selecting the optimal AI model.

More particularly, provided are a method of selecting an AI model optimized to process input data, from among a plurality of AI models based on the input data to be processed, and a display device for performing the method.

Additional aspects will be set forth in part in the description which follows and, in part, will be apparent from the description, or may be learned by practice of the presented embodiments of the disclosure.

According to an embodiment of the disclosure, a method of selecting an artificial intelligence (AI) model based on input data includes obtaining misclassified data corresponding to misclassification results of a training data set when each of a plurality of AI models receives the training data set, classifies the training data set into at least one class, and outputs classification results, obtaining a additional trained AI model by training the additional AI model on the misclassified data, inputting first data to the additional trained AI model and outputting misclassification probabilities of the plurality of AI models, and selecting one of the plurality of AI models, based on the misclassification probabilities.

The selecting may include selecting an AI model corresponding to a lowest value of the misclassification probabilities, from among the plurality of AI models.

The obtaining of the additional trained AI model may include inputting the misclassified data to the additional AI model and training the additional AI model about by which of the plurality of AI models the misclassified data is classified, and obtaining the additional trained AI model.

The obtaining of the additional trained AI model may include inputting the misclassified data to the additional AI model and training the additional AI model about characteristics and distribution of data on which each of the plurality of AI models are not correctly trained.

The method may further include inputting the first data to and outputting a result of classifying the first data into the at least one class, from the selected AI model.

The additional AI model may include an AI model different from the plurality of AI models.

The misclassification probabilities may indicate probabilities that the plurality of AI models misclassify input data.

The obtaining of the misclassified data may include inputting the training data set to each of the plurality of AI models, classifying the training data set into the at least one class, and outputting the classification results, and obtaining the misclassified data corresponding to wrong values of the classification results of the training data set.

At least one of a hyper-parameter, a model architecture, a training technique, or dataset input for training may be configured differently for the plurality of AI models.

The method may further include adjusting, based on the misclassification probabilities, a plurality of weight values applied to at least one of the plurality of AI models comprising an ensemble AI model.

The adjusting of the plurality of weight values may include adjusting the plurality of weight values applied to at least one of the plurality of AI models, in such a manner that the weight value is reduced when the misclassification probability is high.

The method may further include inputting the first data to the ensemble AI model and outputting a final classification result corresponding to the first data.

The plurality of AI models may include an ensemble AI model configured by combining a plurality of AI models.

The plurality of AI models may include at least one on-device AI model and at least one server-based AI model.

According to another embodiment of the disclosure, a display device includes a display, and a processor configured to execute at least one instruction to obtain misclassified data corresponding to misclassification results of a training data set when each of a plurality of artificial intelligence (AI) models receives the training data set, classifies the training data set into at least one class, and outputs classification results, obtain a additional trained AI model by training the additional AI model on the misclassified data, input first data to the additional trained AI model and control the additional trained AI model to output misclassification probabilities of the plurality of AI models, and select one of the plurality of AI models, based on the misclassification probabilities.

According to another embodiment of the disclosure, a computer-readable recording medium has recorded thereon a computer program for executing a method of selecting an artificial intelligence (AI) model based on input data, the method including obtaining misclassified data corresponding to misclassification results of a training data set when each of a plurality of AI models receives the training data set, classifies the training data set into at least one class, and outputs classification results, obtaining a additional trained AI model by training the additional AI model on the misclassified data, inputting first data to the additional trained AI model and outputting misclassification probabilities of the plurality of AI models, and selecting one of the plurality of AI models, based on the misclassification probabilities.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A is a diagram illustrating a neural network for generating output data corresponding to input data;

FIG. 1B is a diagram illustrating a neural network for generating output data corresponding to input data;

FIG. 2A is a flowchart of a method of selecting an AI model based on input data, according to an embodiment of the disclosure;

FIG. 2B is a flowchart of a method of selecting an AI model based on input data, according to an embodiment of the disclosure;

DETAILED DESCRIPTION

Figure 3:
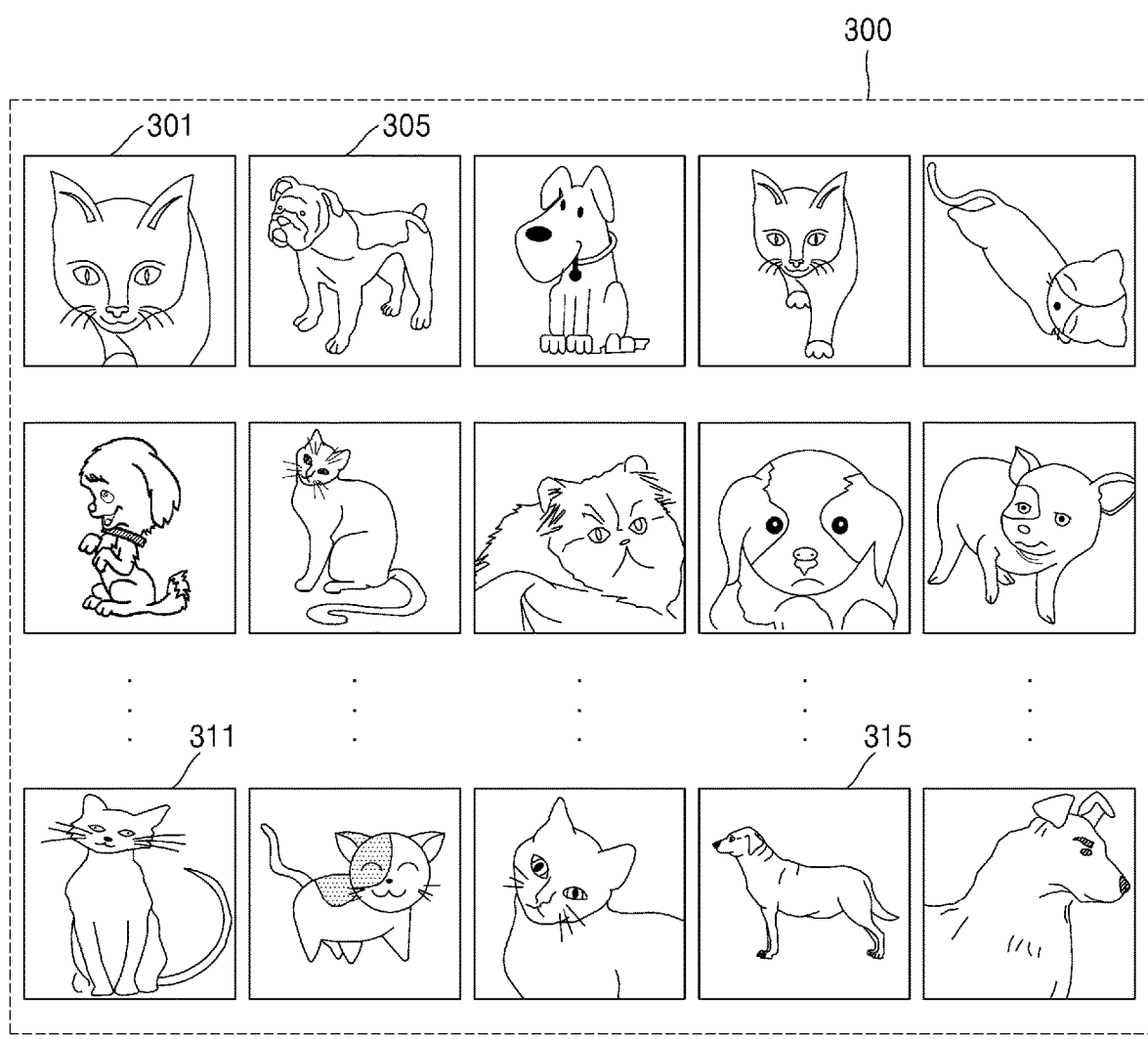
FIG. 3 is a diagram illustrating a training data set according to an embodiment of the disclosure.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts unrelated to the disclosure are omitted for clarity of explanation, and like reference numerals denote like elements throughout.

It will be understood that, when an element is referred to as being "connected to" another element, the element may be "directly connected to" the other element or be "electrically connected to" the other element through an intervening element. It will be further understood that the terms "includes" and/or "including," when used herein, specify the presence of stated elements, but do not preclude the presence or addition of one or more other elements, unless the context clearly indicates otherwise.

Herein, expressions such as "some embodiments of the disclosure" and "an embodiment of the disclosure" do not always designate the same embodiment(s) of the disclosure.

Some embodiments of the disclosure may be described in terms of functional blocks and various processing steps. Some or all of the functional blocks may be implemented by any variety of hardware and/or software elements configured to perform certain functions. For example, the functional blocks of the disclosure may be implemented by one or more processors or microprocessors, or circuit elements for certain functions. As another example, the functional blocks of the disclosure may be implemented using any programming or scripting language. The functional blocks may be implemented using various algorithms executed by the one or more processors. Furthermore, the hardware and/or software elements may employ known technologies for electronic settings, signal processing, and/or data processing. Terms such as "module," "element," and "unit" may be widely used to refer to logical elements and are not limited to mechanical and physical elements.

In addition, connection lines or connection members between elements shown in the drawings illustrate functional connections and/or physical or circuit connections. Connections between elements may be represented by replaceable or additional various functional connections, physical connections, or circuit connections in an actual device.

Throughout the disclosure, the expression "at least one of a, b or c" indicates only a, only b, only c, both a and b, both a and c, both b and c, all of a, b, and c, or variations thereof.

The expression "at least one of A or B" indicates "A or B" or "A and B."

In an embodiment of the disclosure, an artificial intelligence (AI) model may include a plurality of neural network layers. Each layer has a plurality of weight values, and performs calculations by applying the plurality of weight values to calculation results of a previous layer.

A neural network for configuring the AI model may be a set of algorithms for learning a method of recognizing an object from an input image, based on AI technology.

For example, the neural network may be trained to learn a method of recognizing an object from an image, based on (i) supervised learning using images as input values and/or (ii) unsupervised learning for finding a pattern or method of recognizing an object from an image, by autonomously learning required data without any supervision. As another example, the neural network may learn a method of recognizing an object from an image, by using reinforcement learning using feedback on whether a result of recognizing an object is correct. As another example, the neural network may learn a method of recognizing an object from an image, by using semi-supervised learning.

The neural network performs calculations based on AI technology, and may also be called an artificial neural network. The neural network may be a deep neural network (DNN) for performing calculations through a plurality of hidden layers.

Specifically, the neural network may be classified into a DNN when a plurality of hidden layers for calculations are included therein, i.e., when a depth of the neural network for calculations is increased. Examples of the neural network include a convolutional neural network (CNN), a DNN, a recurrent neural network (RNN), a restricted Boltzmann machine (RBM), a deep belief network (DBN), a bidirectional recurrent deep neural network (BRDNN), and a deep Q-network, and the neural networks employed throughout embodiments of the disclosure are not limited to the above-mentioned examples unless specified herein. The CNN may be subdivided into a deep convolution neural network (DCNN) or a capsule neural network (CapsNet).

As described above, an 'AI model' may refer to a neural network including at least one layer operating to receive input data and output a desired result. The 'AI model' may refer to an algorithm or a set of a plurality of algorithms for outputting a desired result by performing calculations through a neural network, a processor for executing the algorithm or the set of algorithms, software for executing the algorithm or the set of algorithms, or hardware for executing the algorithm or the set of algorithms.

In an embodiment of the disclosure, the AI model outputs a result corresponding to input data, by performing calculations through a neural network. The AI model according to an embodiment of the disclosure may be configured as a neural network for analyzing input data and recognizing and classifying an object included in the input data.

The AI model according to an embodiment of the disclosure may be configured as a neural network for analyzing input data and outputting a classification result according to a certain criterion.

The AI model according to an embodiment of the disclosure will now be described with reference to FIGS. 1A and 1B.

FIG. 1A is a diagram illustrating a neural network for generating output data corresponding to input data. FIG. 1A illustrates, as an example, a DNN including three hidden layers 120.

Specifically, FIG. 1A illustrates an AI model for receiving an image as input, recognizing and classifying an object in the image through a DNN, and outputting a result corresponding thereto. FIG. 1A illustrates a case in which the AI model is configured as a DNN 101.

Referring to FIG. 1A, the DNN 101 may be trained using training data. The DNN 101, which is trained, may perform calculations for object recognition. Herein, the DNN 101 may be designed in a wide variety of forms according to, e.g., a model implementation scheme (e.g., a convolutional neural network (CNN)), result accuracy, result reliability, or a processor calculation speed and capacity.

The DNN 101 may include an input layer 111, the hidden layers 120, and an output layer 130 to perform calculations for object recognition.

Each of a plurality of layers included in the DNN 101 may include one or more nodes. For example, the input layer 111 may include one or more nodes 110 for receiving data. FIG. 1A illustrates, as an example, a case in which the input layer 111 includes a plurality of nodes 110. A plurality of images obtained by scaling an input image 103 may be respectively input to the plurality of nodes 110. Specifically, a plurality of images obtained by scaling the image 103 per frequency band may be input to the plurality of nodes 110.

Herein, two adjacent layers are connected by a plurality of edges 112 illustrated in FIG. 1A. Because each node has a corresponding weight value, the DNN 101 may obtain output data, based on values obtained by performing calculations, e.g., multiplication, between input signals and weight values. FIG. 1A illustrates, as an example, a case in which nodes included in a layer are 'full-connected' to nodes included in an adjacent layer. However, only some nodes included in the layer may be connected to nodes included in the adjacent layer. In this case, at least one node included in the layer may not be connected to at least one node included in the adjacent layer.

The DNN 101 may be trained based on a plurality of training images and be constructed as an object recognition model for recognizing an object included in an image. Specifically, to increase the accuracy of an object recognition result output from the DNN 101, the weight values may be modified by repetitive training based on the plurality of training images in a direction from the output layer 130 to the input layer 111.

The DNN 101 having the finally modified weight values may be used as an object recognition model. When the DNN 101, which is trained to receive input images and recognize objects included in the images, receives the input image 103, the DNN 101 may analyze the image 103 and output a result that an object included in the image 103 is a 'panda.'

FIG. 1B is a diagram illustrating a neural network for generating output data corresponding to input data. Like reference numerals in FIGS. 1A and 1B denote like elements.

Referring to FIG. 1B, an AI model according to an embodiment of the disclosure may be configured as a neural network for analyzing input data and outputting a classification result according to a certain criterion. Specifically, the AI model according to an embodiment of the disclosure may be configured as the DNN 101, which is trained to analyze input data and classify the type of the input data.

The input data input to the DNN 101 may include various types of data. Specifically, the input data may be image data as illustrated in FIG. 1A. Alternatively, the input data may be sound data, text data, or the like. FIG. 1B illustrates, as an example, a case in which the DNN 101 receives input sound data, analyzes the input sound data, and outputs a classification result indicating at least one class of the sound data.

Referring to FIG. 1B, the DNN 101 may receive input sound data and analyze the input sound data through the hidden layers 120 included in the DNN 101. The DNN 101 may output a result 190 of classifying the input sound data into at least one class or type of sound, e.g., speech, music, noise, etc.

For example, when the input sound data is speech data uttered by a user, the DNN 101 may output a classification result indicating 'Speech.'

The result 190 may include a detailed classification result. For example, when the input sound data corresponds to music, a detailed class or subclass of music, e.g., classic, jazz, pop, rap, or folk, may be output.

In FIGS. 1A and 1B, the result output from the DNN 101 may be incorrect. For example, the result output from the DNN 101 may have an accuracy rate of 90%. In this case, there may exist a 10% probability that the output result is incorrect.

A variety of AI models for receiving input and outputting a desired result may be available. Specifically, a variety of AI models may be present according to the architecture of a neural network, setting of an applied hyper-parameter, training data used to train the neural network, a training technique, etc.

When the same image is input, a plurality of AI models for which at least one of the architecture of a neural network, setting of an applied hyper-parameter, training data used to train the neural network, or a training technique is configured differently may have different processing, recognition, and/or classification accuracies.

In the example illustrated in FIG. 1A, it is assumed that a first AI model, a second AI model, and a third AI model, which have different architectures of a neural network for recognizing an object and classifying the recognized object, are present. For any input image, is also assumed that the first AI model has a result accuracy of 60%, the second AI model has a result accuracy of 70%, and the third AI model has a result accuracy of 90%. Herein, the result accuracy may refer to a value calculated by averaging accuracies of results output by each AI model for a plurality of inputs.

In this case, the same panda image (e.g., see reference numeral 130) may be input to the first, second, and third AI models. Although the first AI model may have the lowest general accuracy for recognizing an object, the first AI model may correctly output a result indicating a 'panda.' On the other hand, although the second AI model and the third AI model may have higher general accuracies for recognizing an object, the second AI model may incorrectly output a result indicating a 'dog,' and the third AI model may incorrectly output a result indicating a 'person.'

In the above example, among the first, second, and third AI models, the third AI model has the highest result accuracy. However, the third AI model having the highest result accuracy outputs an incorrect classification result. Conversely, the first AI model having the lowest result accuracy outputs a correct classification.

Thus, owing to an inherent error in an AI model classifying an object of an image, even an AI model having the highest result general accuracy may incorrectly recognize an object. Such imprecision may be due to difficulty of the AI model to correctly analyze particular characteristics of an input image.

As a result, the accuracy of a processing result may vary depending on an AI model selected from among a plurality of AI models. Therefore, a method and apparatus for automatically selecting the best AI model having a highest accuracy for performing object recognition may, in fact, more accurately recognize an object of an image than an AI model having a highest general accuracy for recognizing any given input object.

Embodiments of the disclosure for selecting an AI model capable of accurately outputting a correct result for input data will now be described with reference to the attached drawings.

A method according to an embodiment of the disclosure is a method of selecting an AI model based on input data, to select an preferable AI model that is more optimized for input data.

The method according to an embodiment of the disclosure (e.g., a method 200 of selecting an AI model based on input data, which is illustrated in FIG. 2A) may be performed by at least one processor for executing at least one instruction (or an electronic device including the at least one processor). Herein, the processor may execute one or more instructions to perform operations included in the method of selecting an AI model based on input data, according to an embodiment of the disclosure. The processor may be implemented with hardware or software. Specifically, the processor may include a graphics processing unit (GPU) for processing graphics corresponding to video data. The processor may be implemented as a system on chip (SoC) in which a core is integrated with a GPU. The processor may include a single core, dual cores, triple cores, quad cores, or multiple cores thereof.

The above-described processor may be included in at least one of an electronic device or a server. Therefore, the method according to an embodiment of the disclosure (e.g., the method 200 of selecting an AI model based on input data, which is illustrated in FIG. 2A) may be performed by at least one of the electronic device or the server including the above-described processor. Of course, the methods of the disclosure may be performed by an electronic device and a server communicating in a client-server relationship over one or more networks, such as the Internet.

Herein, the electronic device may be an electronic device including a display. Specifically, the electronic device including a display may be implemented in various forms, e.g., a mobile phone, a tablet PC, a digital camera, a camcorder, a laptop computer, a desktop computer, an e-book reader, a digital broadcast receiver, a personal digital assistant (PDA), a portable multimedia player (PMP), a navigation system, an MP3 player, or a wearable device. The electronic device may be a stationary electronic device provided at a fixed location or a portable electronic device a user may carry, or may be a digital broadcast receiver capable of receiving digital broadcast signals. Hereinafter, the electronic device including a display is called a 'display device.'

The server may include a server, a server system, or a server-based device, which transmits data to and receives data from the electronic device through a communication network, and processes data. Hereinafter, for convenience of explanation, the server, the server system, and the server-based device are collectively called 'servers.'

Methods according to embodiments of the disclosure will now be described in detail with reference to FIGS. 2A to 11. Apparatuses capable of performing the methods according to embodiments of the disclosure will be described in detail below with reference to FIGS. 12 to 19.

FIG. 2A is a flowchart of the method of selecting an AI model based on input data, according to an embodiment of the disclosure.

The method 200 of selecting an AI model based on input data, according to an embodiment of the disclosure, includes operation S210 of obtaining misclassified data corresponding to misclassification results of a training data set when each of a plurality of AI models receives the training data set, classifies the training data set into at least one class, and outputs the classification results, operation S220 of obtaining an additional trained AI model by training the additional AI model on the misclassified data, operation S230 of inputting first data to the additional trained AI model and outputting misclassification probabilities of the plurality of AI models, and operation S240 of selecting one of the plurality of AI models, based on the misclassification probabilities.

The method 200 of selecting an AI model based on input data, according to an embodiment of the disclosure, will now be described in detail with reference to FIGS. 2A to 8.

Referring to FIG. 2A, the method 200 of selecting an AI model based on input data includes operation S210 of obtaining the misclassified data corresponding to the misclassification results of the training data set when each of the plurality of AI models receives the training data set, classifies the training data set into the at least one class, and outputs the classification results.

Herein, the plurality of AI models may be different AI models for outputting classification or recognition results. Alternatively, the plurality of AI models may be different AI models usable for a test. Alternatively, the plurality of AI models may be a plurality of AI models selectable or usable by a server, a device, or a server-device-combined system, which performs the method 200 of selecting an AI model based on input data.

For example, the plurality of AI models may be different AI models for recognizing and classifying objects. For example, when the user desires that an object included in an input image is analyzed and classified into a dog or a cat, the plurality of AI models may recognize and classify the object (e.g., the dog or the cat) and output the classification result.

The training data set refers to a set of data input to train each of the plurality of AI models. To generate a desired output by analyzing input data, an AI model is provided a plurality of input data and may be trained to autonomously find or learn about processing for obtaining or extracting a desired output by analyzing the plurality of input data. In this case, a set of data input to train the AI model may be called the 'training data set.' That is, the training data set may be a set of data input to an AI model to train the AI model.

The training data set and the plurality of AI models will now be described in detail with reference to FIGS. 3 to 6.

FIG. 3 is a diagram illustrating a training data set 300 according to an embodiment of the disclosure.

Referring to FIG. 3, the training data set 300 may refer to a set of images input to each of a plurality of AI models.

FIG. 3 illustrates, as an example, a case in which the training data set 300 is a set including images 301, 305, 311, and 315 each including a dog or a cat as an object. A case in which the training data set 300 includes 100 images each including a dog or a cat as an object will now be described as an example. The above-mentioned number of images included in the training data set 300 is merely an example, and a much larger number of images may be used to train AI models.

A case in which each of the plurality of AI models mentioned above in operation S210 is an AI model capable of serving as a classifier for recognizing and classifying objects included in images by using the training data set 300 is described below as an example. For example, each of the plurality of AI models may receive input data and then output a classification result indicating at least one class corresponding to input data. For example, when each of the plurality of AI models is an AI model for classifying an object included in the input data and outputting the classification result, the AI model may receive the input data and output a corresponding classification result.

Figure 4:
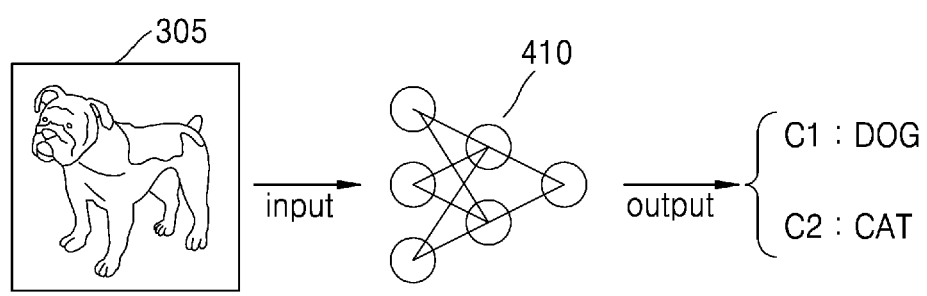
FIG. 4 is a diagram illustrating a classification operation according to an embodiment of the disclosure.

FIG. 4 is a diagram illustrating a classification operation according to an embodiment of the disclosure.

FIG. 4 illustrates, as an example, a case in which each of the plurality of AI models is an AI model for recognizing an object included in an input image, classifying the type of the recognized object as a dog or a cat, and outputting the classification result (C1: dog or C2: cat).

Referring to FIG. 4, for training, each of the plurality of AI models may receive images included in the training data set 300 and recognize and classify an object included in each of the received images. The classification result output from each of the plurality of AI models may be one of at least one class.

In FIG. 4, an AI model 410 may be one of the plurality of AI models.

When each of the plurality of AI models, e.g., the AI model 410, is trained on the training data set 300, the AI model 410 may be trained separately on images of the same objects. Specifically, the AI model 410 may be trained sequentially on dog images 305, 315, etc. of the training data set 300, and then trained sequentially on cat images 301, 311, etc. of the training data set 300.

The AI model 410 may output a classification result corresponding to input data. Referring to FIG. 4, the AI model 410 may receive input data (e.g., the image 305), recognize and classify an object included in the image 305, and output the result indicating a first class C1 or a second class C2. FIG. 4 illustrates, as an example, a case in which a first class C1 indicates a dog and a second class C2 indicates a cat.

It is assumed that the AI model 410 receives the image 305 including a dog as an object. In this case, the AI model 410 may output a classification result indicating a 'dog' when the object included in the input image 305 is correctly recognized and classified, or output a classification result indicating a 'cat' when the object included in the input image 305 is incorrectly recognized and classified.

Hereinafter, when the AI model 410 outputs an incorrect result, the input data is called 'misclassified data.' For example, when the AI model 410 receives the image 305 and outputs a classification result indicating a 'cat,' the image 305 may be included in the 'misclassified data.'

Figure 5:
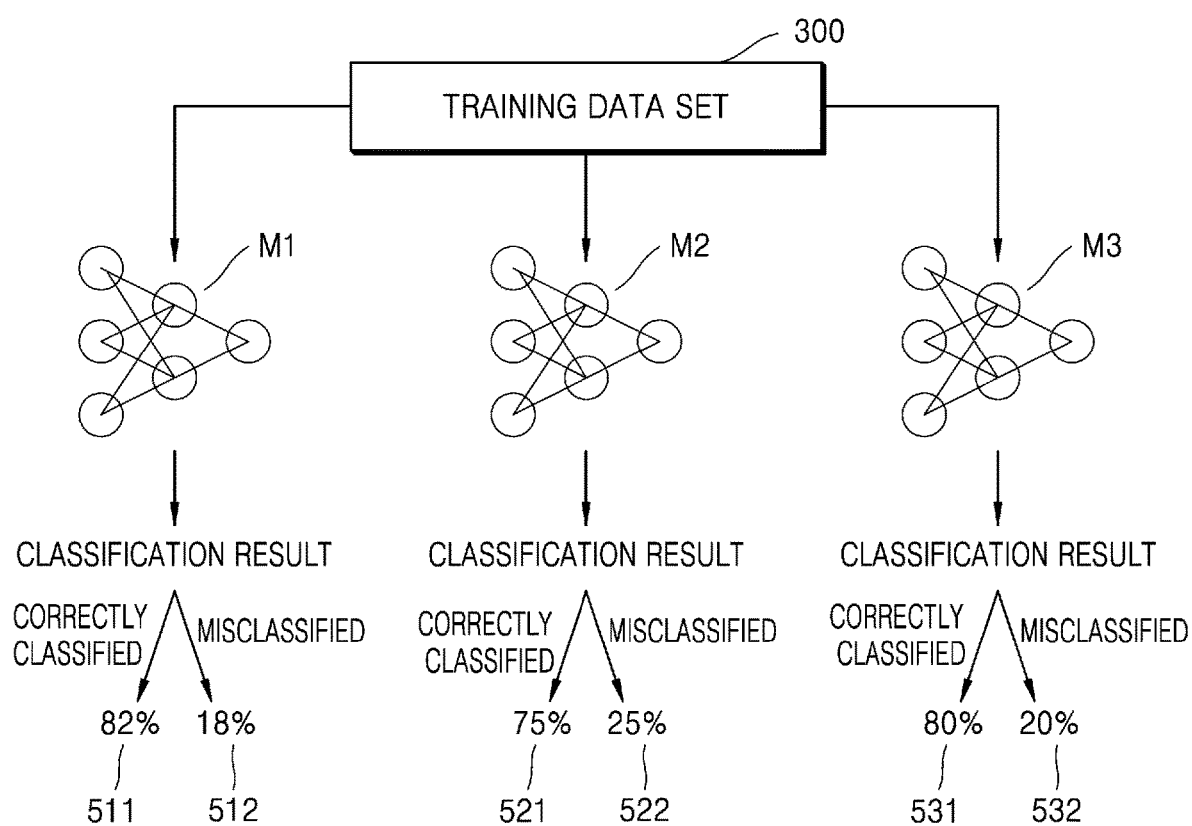
FIG. 5 is a diagram illustrating misclassified data obtained in an embodiment of the disclosure.

FIG. 5 is a diagram illustrating misclassified data obtained in an embodiment of the disclosure.

FIGS. 5 to 8 illustrate, as an example, a case in which the plurality of AI models mentioned above in operation S210 include three AI models.

Referring to FIG. 5, the plurality of AI models trained using the training data set 300 may include a first AI model M1, a second AI model M2, and a third AI model M3.

Referring to FIG. 5, the first AI model M1 may receive the training data set 300, be trained on each of a plurality of images included in the training data set 300, and perform object recognition and classification. In the case of the first AI model M1, a ratio of correct classification results may be 82% (see reference numeral 511) and a ratio of incorrect classification results (or misclassification results) may be 18% (see reference numeral 512). As such, when the training data set 300 includes 100 images, misclassified data collected from the first AI model M1 may include 18 images of the training data set 300.

The second AI model M2 may receive the training data set 300, be trained on each of a plurality of images included in the training data set 300, and perform object recognition and classification. In the case of the second AI model M2, a ratio of correct classification results may be 75% (see reference numeral 521) and a ratio of incorrect classification results (or misclassification results) may be 25% (see reference numeral 522). As such, when the training data set 300 includes 100 images, misclassified data collected from the second AI model M2 may include 25 images of the training data set 300.

The third AI model M3 may receive the training data set 300, be trained on each of a plurality of images included in the training data set 300, and perform object recognition and classification. In the case of the third AI model M3, a ratio of correct classification results may be 80% (see reference numeral 531) and a ratio of incorrect classification results (or misclassification results) may be 20% (see reference numeral 532). Herein, a probability that a classification result is correct may be expressed as a classification accuracy. As such, when the training data set 300 includes 100 images, misclassified data collected from the third AI model M3 may include 20 images of the training data set 300.

Referring to FIG. 5, the misclassified data collected from the first AI model M1 may include data of the training data set 300 corresponding to a misclassification probability (i.e., 18%). The misclassified data collected from the second AI model M2 may include data of the training data set 300 corresponding to a misclassification probability (i.e., 25%). The misclassified data collected from the third AI model M3 may include data of the training data set 300 corresponding to a misclassification probability (i.e., 20%).

As illustrated in FIGS. 4 and 5, the plurality of AI models may have different classification accuracies and/or classification results.

Although the same training data set is input, the plurality of AI models may have different classification accuracies. In addition, although the same training data set is input, the plurality of AI models may output different classification results.

Figure 6:
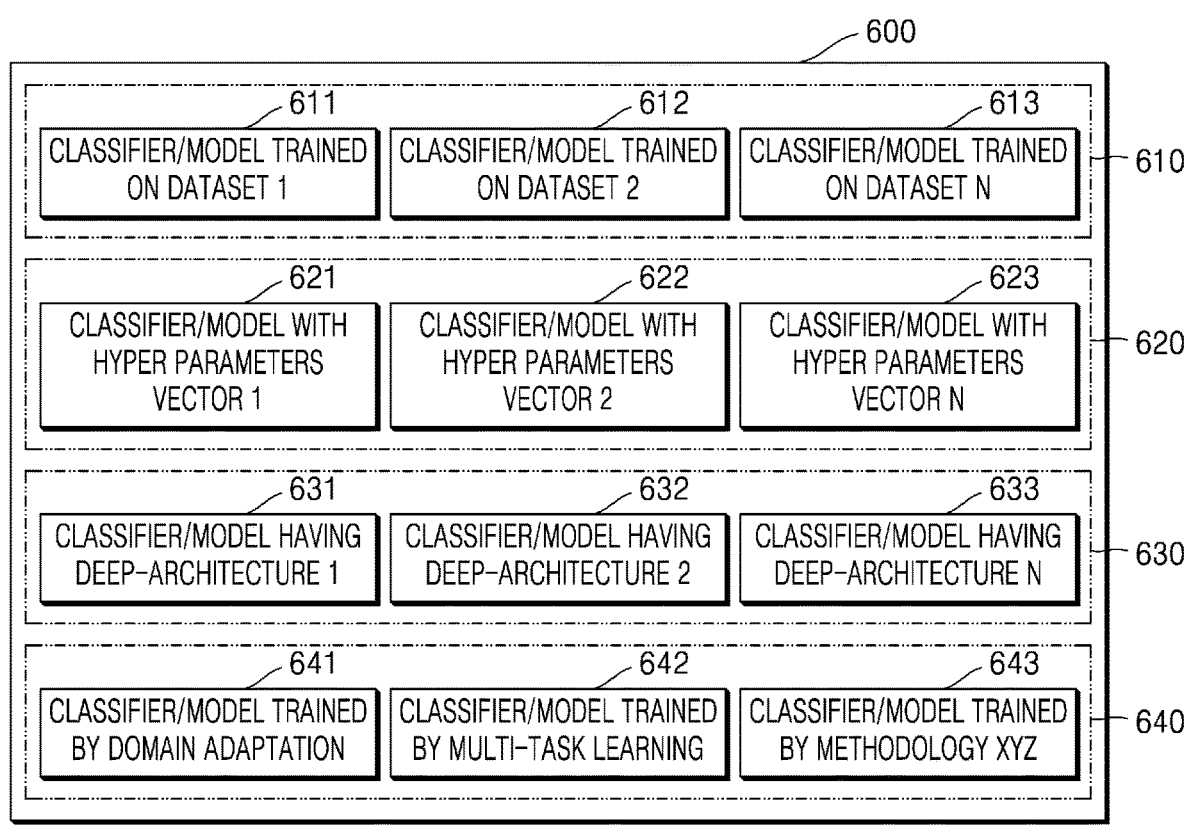
FIG. 6 is a diagram illustrating a plurality of AI models according to an embodiment of the disclosure.

FIG. 6 is a diagram illustrating a plurality of AI models according to an embodiment of the disclosure.

In an embodiment of the disclosure, at least one of the architecture of a neural network, setting of an applied hyper-parameter, training data used to train the neural network, or a training technique may be configured differently for the plurality of AI models.

Referring to FIG. 6, as shown in a block 600, at least one of the architecture of a neural network, setting of an applied hyper-parameter, training data used to train the neural network, or a training technique may be configured differently for the plurality of AI models.

For example, N shown in a block 600 may be 3. In detail, the first AI model M1 may be a model 611 trained on a first training data set Dataset 1, the second AI model M2 may be a model 612 trained on a second training data set Dataset 2, and the third AI model M3 may be a model 613 trained on a third training data set Dataset 3. Herein, the first training data set Dataset 1, the second training data set Dataset 2, and the third training data set Dataset 3 indicate different sets of images.

As another example, the first AI model M1 may be a model 621 having a first hyper-parameter (e.g., a hyper-parameter vector 1), the second AI model M2 may be a model 622 having a second hyper-parameter (e.g., a hyper-parameter vector 2), and the third AI model M3 may be a model 623 having a third hyper-parameter (e.g., a hyper-parameter vector 3. The first hyper-parameter (e.g., the hyper-parameter vector 1), the second hyper-parameter (e.g., the hyper-parameter vector 2), and the third hyper-parameter (e.g., the hyper-parameter vector 3) are set to be different values.

Herein, the hyper-parameter may include parameters such as the number of hidden layers in a neural network for configuring an AI model, a learning rate, a batch size, a loss function, and a weight decay rate.

As another example, the first AI model M1 may be a model 631 having a first architecture Deep-architecture 1, the second AI model M2 may be a model 632 having a second architecture Deep-architecture 2, and the third AI model M3 may be a model 633 having a third architecture Deep-architecture 3. Herein, the architecture indicates the architecture of an AI model, and the first architecture Deep-architecture 1, the second architecture Deep-architecture 2, and the third architecture Deep-architecture 3 are different.

As another example, the first AI model M1 may be a model 641 trained by a first training technique (e.g., domain adaptation), the second AI model M2 may be a model 642 trained by a second training technique (e.g., multi-task learning), and the third AI model M3 may be a model 643 trained by a third training technique (e.g., methodology XYZ). That is, the first AI model M1, the second AI model M2, and the third AI model M3 may be trained by different training techniques.

As described above, when a plurality of AI models are present for which at least one of the architecture of a neural network, setting of an applied hyper-parameter, training data used to train the neural network, or a training technique is configured differently, although the same data is input to the plurality of AI models, the plurality of AI models may have different recognition accuracies. Because AI models may be designed in a wide variety of forms, various AI models for performing the same operation may be present.

For example, in some cases, certain input data may be correctly recognized and classified by the first AI model M1 but may be incorrectly recognized by the second AI model M2.

Therefore, in an embodiment of the disclosure, a method and apparatus for selecting an AI model optimized for input data to be tested by a user, from among various different AI models are disclosed.

Referring back to FIG. 2A, the method 200 of selecting an AI model based on input data includes, after operation S210, operation S220 of obtaining the additional trained AI model by training the additional AI model on the misclassified data. Specifically, operation S220 may include an operation of inputting the misclassified data to the additional AI model and training the additional AI model about by which of the plurality of AI models the misclassified data is classified, and an operation of obtaining the additional trained AI model as the result of training.

Herein, the additional AI model is an AI model different from the plurality of AI models mentioned above in operation S210. The additional AI model may refer to an AI model to be trained on the misclassified data to select an optimal artificial intelligence model to classify the object in the input data. In this regard, the additional AI model may be a selection artificial intelligence model to select the optimal artificial intelligence model. The training of the additional AI model will now be described in detail with reference to FIG. 7.

Figure 7:
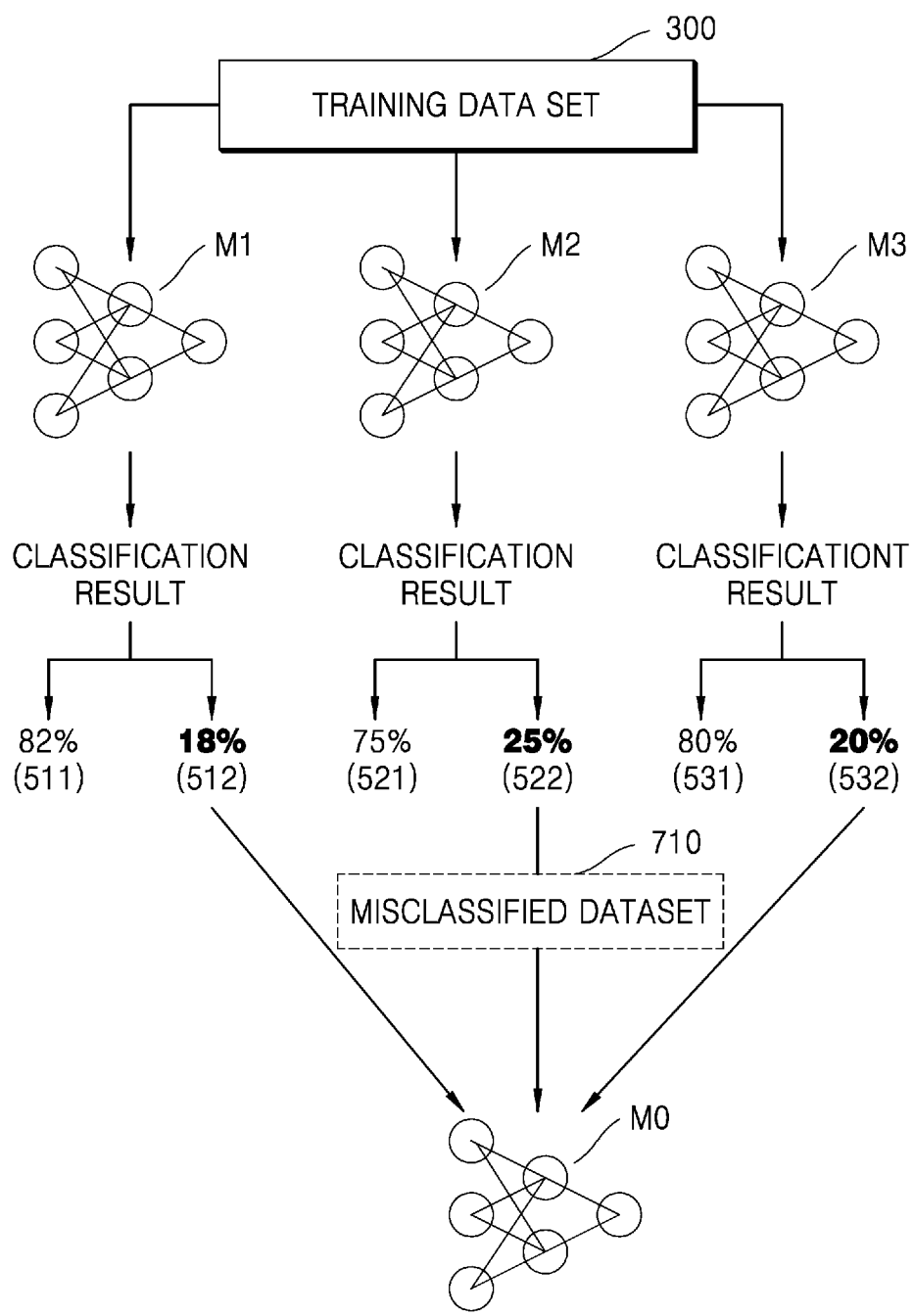
FIG. 7 is a diagram illustrating an additional model training operation according to an embodiment of the disclosure.

FIG. 7 is a diagram illustrating an additional model training operation according to an embodiment of the disclosure.

Referring to FIG. 7, a misclassified dataset 710 used to train an additional AI model M0 refers to a set of misclassified data from a plurality of AI models.

As described in FIG. 5, it is assumed that the training data set 300 includes 100 images. Then, the misclassified dataset 710 may be a set of 18 images collected from the first AI model M1, 25 images collected from the second AI model M2, and 20 images collected from the third AI model M3.

For example, the additional AI model M0 may be trained sequentially on the misclassified data collected from the plurality of AI models.

Specifically, the additional AI model M0 may be trained on the 18 images misclassified by the first AI model M1, trained on the 25 images misclassified by the second AI model M2, and then trained on the 20 images misclassified by the third AI model M3.

Specifically, the additional AI model M0 may be trained on the misclassified dataset 710 to autonomously learn about by which of the plurality of AI models (e.g., M1, M2, and M3) the input data is classified. That is, using the misclassified dataset 710, the additional AI model M0 may be trained about by which of the plurality of AI models (e.g., M1, M2, and M3) the input data is classified.

Specifically, the additional AI model M0 may receive and be trained on the misclassified dataset 710 to learn about characteristics and distribution of data on which each of the plurality of AI models (e.g., M1, M2, and M3) may not be correctly trained.

For example, the additional AI model M0 may be trained on the 18 images misclassified by the first AI model M1, to autonomously learn about images having image characteristics which may not be recognized and/or classified by the first AI model M1, or image characteristics of images which may not be recognized and/or classified by the first AI model M1. Herein, the image characteristics may refer to features for representing an object, e.g., a resolution of an image, an object representation method, pixel values, characteristics of edges included in the image, and colors of the image.

The additional AI model M0 may be trained on the 25 images misclassified by the second AI model M2, to autonomously learn about images having image characteristics which may not be recognized and/or classified by the second AI model M2, or image characteristics of images which may not be recognized and/or classified by the second AI model M2. Subsequently, the additional AI model M0 may be trained on the 20 images misclassified by the third AI model M3, to autonomously learn about images having image characteristics which may not be recognized and/or classified by the third AI model M3, or image characteristics of images which may not be recognized and/or classified by the third AI model M3.

Referring back to FIG. 2A, the method 200 of selecting an AI model based on input data includes, after operation S210, operation S230 of outputting the misclassification probabilities of the plurality of AI models when the first data is input to the additional AI model trained in operation S220.

Herein, the first data is data input to the additional trained AI model M0. Specifically, the first data may be data for which a result is to be output from the additional trained AI model M0.

For example, when the user desires to test a certain image including an object by using an AI model, the image to be tested may be the first data. That is, the first data may be test data.

Operation S230 will now be described in detail with reference to FIG. 8.

Figure 8:
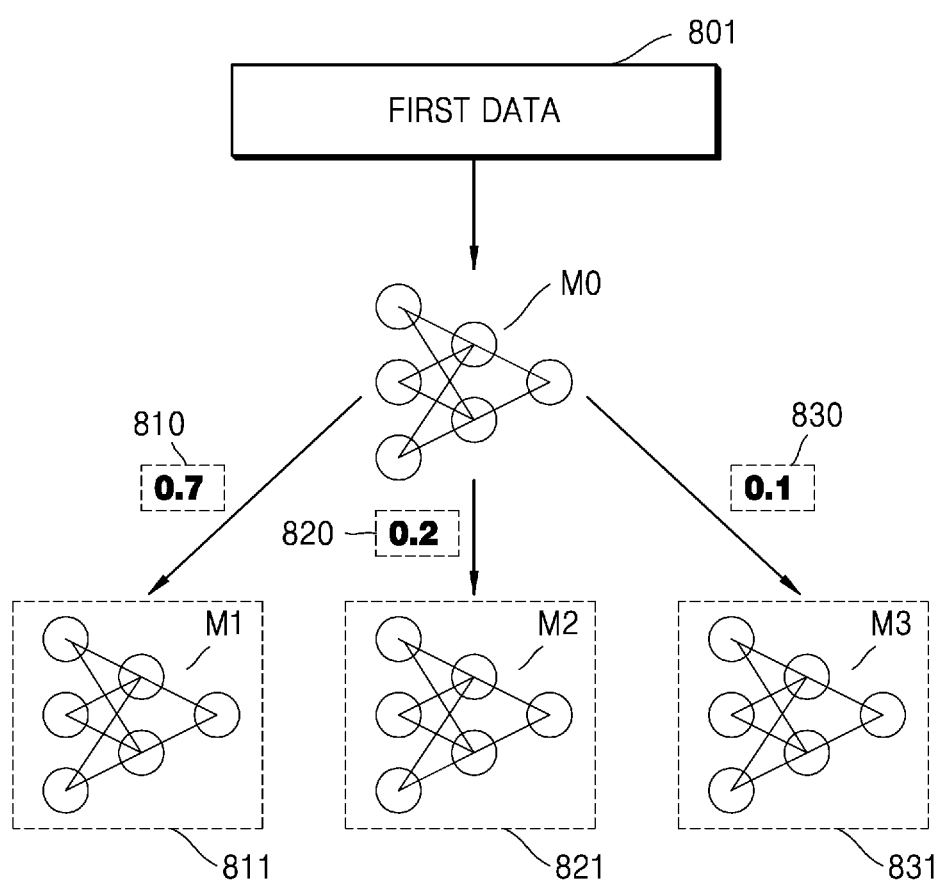
FIG. 8 is a diagram illustrating misclassification probabilities output from an additional trained model.

FIG. 8 is a diagram illustrating misclassification probabilities output from an additional trained model.

Referring to FIG. 8, an additional trained AI model M0 may receive first data 801 and output 'misclassification probabilities' indicating probabilities that the first data 801 is misclassified by a plurality of AI models. Herein, a sum of the misclassification probabilities corresponding to the plurality of AI models may be 1 or 100%.

As described above, in operation S220, the additional AI model M0 receives and is trained on the misclassified dataset 710 corrected from the plurality of AI models (e.g., M1, M2, and M3). Therefore, the additional trained AI model M0 knows characteristics and distribution of data on which the plurality of AI models (e.g., M1, M2, and M3) may be incorrectly trained. Accordingly, when the first data 801 is received, the additional trained AI model M0 may analyze characteristics and distribution of the first data 801 and calculate probabilities that the first data 801 having the analyzed characteristics and distribution is misclassified by the plurality of AI models (e.g., M1, M2, and M3).

Referring to FIG. 8, when the plurality of AI models include the first AI model M1, the second AI model M2, and the third AI model M3, a probability that the first data 801 is misclassified by the first AI model M1 may be 0.7 (or 70%) (see reference numeral 810), a probability that the first data 801 is misclassified by the second AI model M2 may be 0.2 (or 20%) (see reference numeral 820), and a probability that the first data 801 is misclassified by the third AI model M3 may be 0.1 (or 10%) (see reference numeral 830).

That is, classes classified by the additional trained AI model M0 may be the plurality of AI models (e.g., M1, M2 and M3) and the misclassification probabilities corresponding to the plurality of AI models. For example, as the classes classified by the additional trained AI model M0, a first class C1 811 may be a misclassification probability 810 of the first AI model M1, a second class C2 821 may be a misclassification probability 820 of the second AI model M2, and a third class C3 831 may be a misclassification probability 830 of the third AI model M3.

Referring back to FIG. 2A, the method 200 of selecting an AI model based on input data includes operation S240 of selecting one of the plurality of AI models mentioned above in operation S210, based on the misclassification probabilities obtained in operation S230.

Specifically, in the method 200 of selecting an AI model based on input data, an AI model (i.e., one of the plurality of AI models) corresponding to the lowest value of the misclassification probabilities obtained in operation S230 may be selected.

Referring to FIG. 8, the misclassification probabilities output from the additional trained AI model M0 have values of 0.7 (see reference numeral 810), 0.2 (see reference numeral 820), and 0.1 (see reference numeral 830), and the lowest value is 0.1 (see reference numeral 830). As such, in the method 200 of selecting an AI model based on input data, the third AI model M3 corresponding to the lowest probability value of 0.1 (see reference numeral 830) may be selected from among the plurality of AI models (e.g., M1, M2, and M3).

Specifically, an AI model corresponding to the lowest value of the misclassification probabilities output from the additional trained AI model M0 refers to an AI model having the lowest probability of misclassifying the first data 801.

An AI model most optimized for the first data 801 may be an AI model having the lowest probability of misclassifying the first data 801. Therefore, in an embodiment of the disclosure, by selecting one of a plurality of AI models based on misclassification probabilities of the plurality of AI models, an AI model having the lowest probability of misclassifying data to be tested (specifically, the first data 801) may be automatically selected from among a plurality of trained AI models.

FIG. 2B is a flowchart of the method 200 of selecting an AI model based on input data, according to an embodiment of the disclosure. Like reference numerals in FIGS. 2A and 2B denote like elements. Accordingly, redundant descriptions provided above in relation to FIG. 2A will not be repeated.

Referring to FIG. 2B, the method 200 of selecting an AI model may further include operation S250 in addition to the operations illustrated in FIG. 2A.

Referring to FIG. 2B, in the method 200 of selecting an AI model, according to an embodiment of the disclosure, operations S230 and S240 may be repeatedly performed whenever the first data is refined.

Specifically, in the method 200 of selecting an AI model, it may be determined whether new or additional first data is present (operation S250), and operations S230 and S240 may be repeatedly performed based on the determination result of operation S250. The 'new first data' indicated in operation S250 of FIG. 2B is data different from the first data previously input for a test and may refer to every data input to the additional AI model for a test.

That is, in the method 200 of selecting an AI model, when the first data is newly input, operations S230 and S240 may be repeatedly performed based on the new first data to newly select an AI model optimized for the newly input first data.

In the method 200 of selecting an AI model, according to an embodiment of the disclosure, when a plurality of pieces of first data to be tested are present, operations S230 and S240 may be repeatedly performed based on each of the plurality of pieces of first data to be tested. For example, data to be tested by a user may include a 'set' of a plurality of pieces of data instead of a single piece of data. In this case, all pieces of data included in the test dataset may be used as the 'first data.'

For example, when the test dataset includes first test data to tenth test data, in the method 200 of selecting an AI model, operations S230 and S240 may be performed by inputting the first test data to the additional AI model. Then, a certain AI model corresponding to the first test data may be selected. Subsequently, in the method 200 of selecting an AI model, operations S230 and S240 may be performed by inputting the second test data to the additional AI model. Then, a certain AI model corresponding to the second test data may be selected. In this manner, operations S230 and S240 may be repeatedly performed based on each of the third test data to the tenth test data. As such, an AI model optimized for each of the first test data to the tenth test data may be selected.

As described above, in an embodiment of the disclosure, an AI model most likely to correctly obtain a result (e.g., a classification result indicating one of at least one class) corresponding to input data (specifically, the first data 801) may be selected or detected from among a wide variety of AI models. As such, a calculation accuracy (or a result accuracy) of the AI model based on the input data may be increased.

Figure 9:
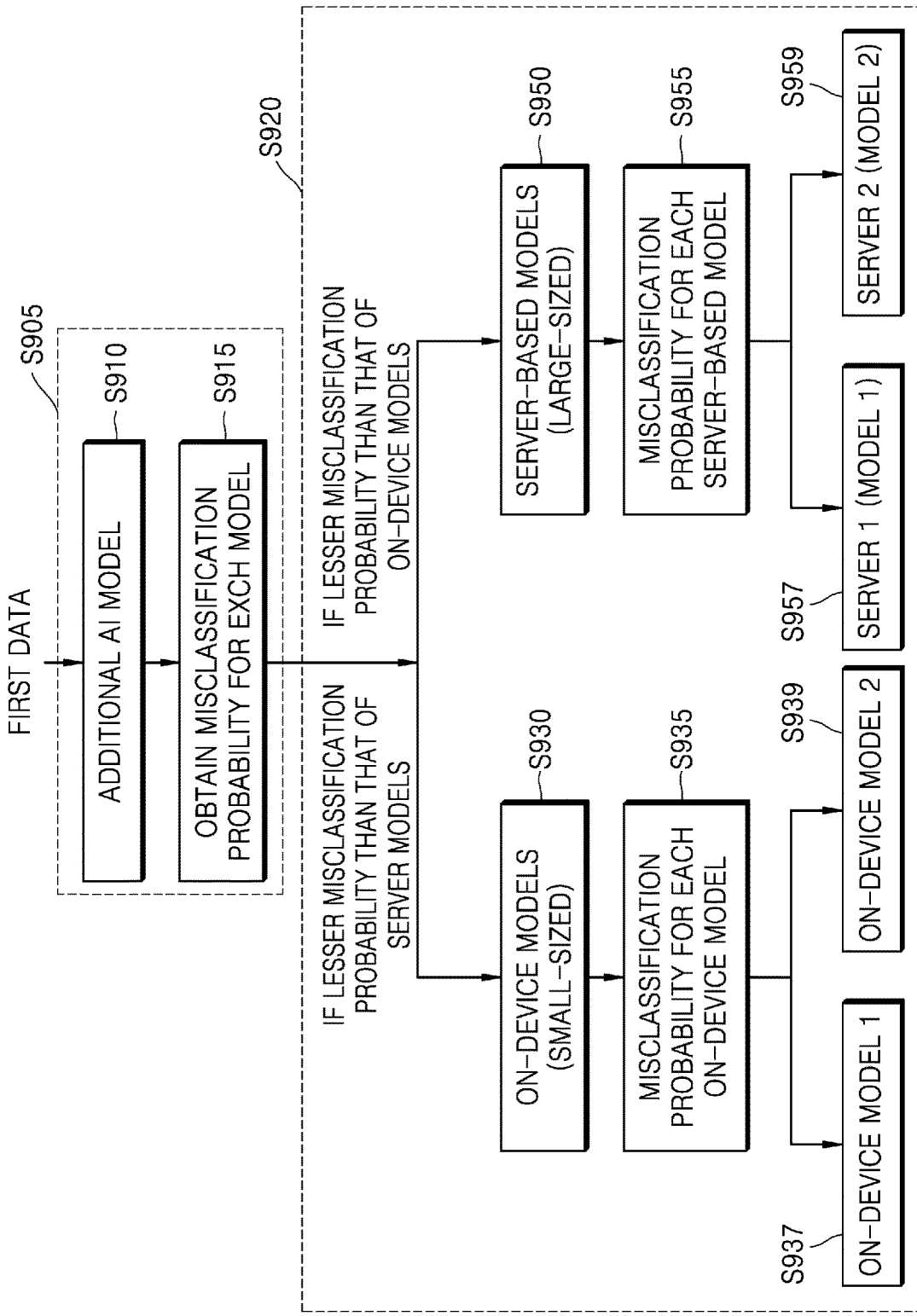
FIG. 9 is a detailed flowchart of a method of selecting an AI model based on input data, according to an embodiment of the disclosure.

FIG. 9 is a detailed flowchart of a method of selecting an AI model based on input data, according to an embodiment of the disclosure.

In an embodiment of the disclosure, the plurality of AI models for receiving and being trained on the training data set, which are described above in operation S210, may include at least one on-device AI model and at least one server-based AI model.

Herein, the on-device AI model refers to an AI model installed in an electronic device instead of a server. The server-based AI model refers to an AI model installed in a server.

Considering the sizes and performances of a memory and a processor, the on-device AI model generally requires lower memory capacity and data processing capacity than those required by the server-based AI model.

Depending on input data to be tested, an output accuracy of the on-device AI model may have a higher value than the output accuracy of the server-based AI model. Alternatively, an output accuracy of the server-based AI model may have a higher value than the output accuracy of the on-device AI model. Accordingly, in an embodiment of the disclosure, the on-device AI model or the server-based AI model may be selected and used based on the misclassification probabilities described above in operation S230.

Referring to FIG. 9, operations S905 and S920 may respectively correspond to operations S230 and S240.

Specifically, an 'additional AI model' indicated in operation S910 is an additional AI model trained using misclassified data collected from the plurality of AI models including the at least one on-device AI model and the at least one server-based AI model, and may correspond to the additional AI model obtained in operation S220.

Referring to FIG. 9, the first data is input to the additional trained AI model M0 (operation S910), and misclassification probabilities of the plurality of AI models (specifically, the at least one on-device AI model and the at least one server-based AI model) are output (operation S915). In the example illustrated in FIG. 9, the plurality of AI models may include a first on-device AI model (On-Device Model 1), a second on-device AI model (On-Device Model 2), a first server-based AI model (Server1 (Model 1)), and a second server-based AI model (Server2 (Model 2)).

Based on the misclassification probabilities obtained in operation S915, when the misclassification probabilities of the on-device AI models are less than the misclassification probabilities of the server-based AI models, the method proceeds to operation S930.

Subsequently, considering the misclassification probability of each on-device AI model (S935), when the misclassification probability of the first on-device AI model (On-Device Model 1) has the lowest value, the first on-device AI model (On-Device Model 1) is selected (operation S937). When the misclassification probability of the second on-device AI model (On-Device Model 2) has the lowest value, the second on-device AI model (On-Device Model 2) is selected (operation S939).

Based on the misclassification probabilities obtained in operation S915, when the misclassification probabilities of the server-based AI models are less than the misclassification probabilities of the on-device AI models, the method proceeds to operation S950.

Subsequently, considering the misclassification probability of each server-based AI model (S955), when the misclassification probability of the first server-based AI model (Server1 (Model 1)) has the lowest value, the first server-based AI model (Server1 (Model 1)) is selected (operation S957). When the misclassification probability of the second server-based AI model (Server 2 (Model 2)) has the lowest value, the second server-based AI model (Server 2 (Model 2)) is selected (operation S959).

As described above, depending on input data to be tested, an output accuracy of the on-device AI model may have a higher value than the output accuracy of the server-based AI model. Accordingly, in an embodiment of the disclosure, when the misclassification probability of the on-device AI model has a lower value than the misclassification probability of the server-based AI model, the on-device AI model may be selected and used to obtain output data corresponding to the input data. Then, output data may be obtained by rapidly and correctly performing AI calculations by using the on-device AI model which uses a small memory.

Figure 10:
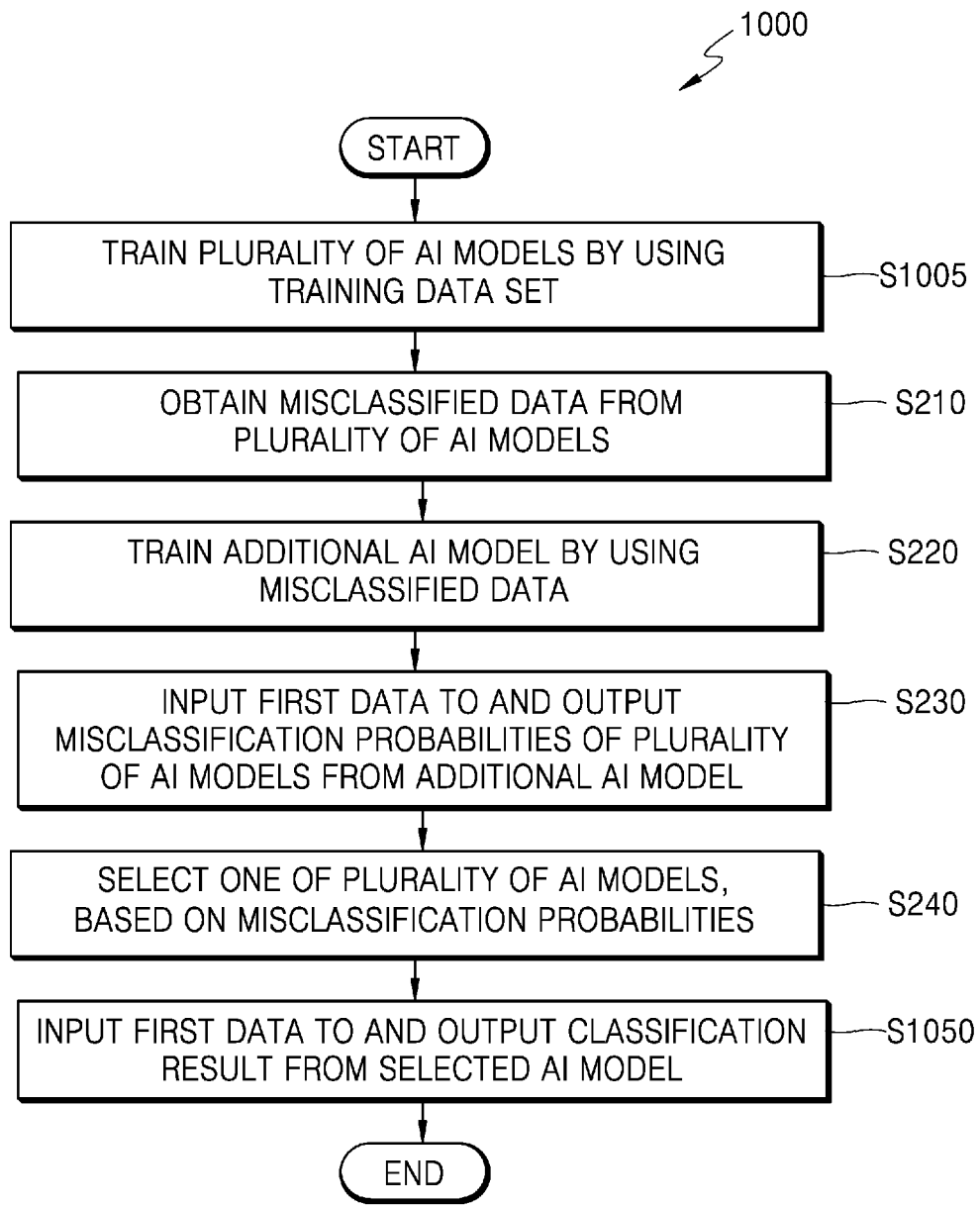
FIG. 10 is a flowchart of a method of selecting an AI model based on input data, according to an embodiment of the disclosure.

FIG. 10 is a flowchart of a method of selecting an AI model based on input data, according to an embodiment of the disclosure. Like reference numerals in FIGS. 2A and 10 denote like elements. Accordingly, redundant descriptions provided above in relation to FIGS. 1 to 9 will not be repeated.

Referring to FIG. 10, the method 1000 of selecting an AI model based on input data may further include, before operation S210, operation S1005 of training the plurality of AI models by using the training data set.

As the result of performing operation S1005, the misclassified data is obtained from each of the plurality of AI models (operation S210).

The method 1000 of selecting an AI model based on input data may further include, after operation S240, operation S1050 of outputting a result corresponding to the first data, by using the selected AI model. That is, the first data may be input to and a corresponding classification result may be output from the selected AI model. Herein, at least a class indicated by the classification result output in operation S1050 includes the same class as the classification result output from each of the plurality of AI models in operation S210. Specifically, when each of the plurality of AI models described in operation S210 recognizes and classifies an object of an input image and outputs a result indicating a first class C1 or a second class C2, the result indicating the first class C1 or the second class C2 may also be output in operation S1050.

Specifically, when the first data is input to the selected AI model, the selected AI model may analyze the first data and perform neural network calculations for outputting a corresponding classification result. For example, when the selected AI model is an AI model for performing the classification operation illustrated in FIG. 4, the selected AI model may recognize and classify an object included in the input first data and output a classification result (e.g., a result indicating a dog or a cat).

As described above, an embodiment of the disclosure may increase accuracy of an output result by generating the output result by selecting an AI model having the lowest probability of misclassifying data to be tested (i.e., the 'first data'), namely an AI model having a highest probability of correctly classifying the input data.

Figure 11:
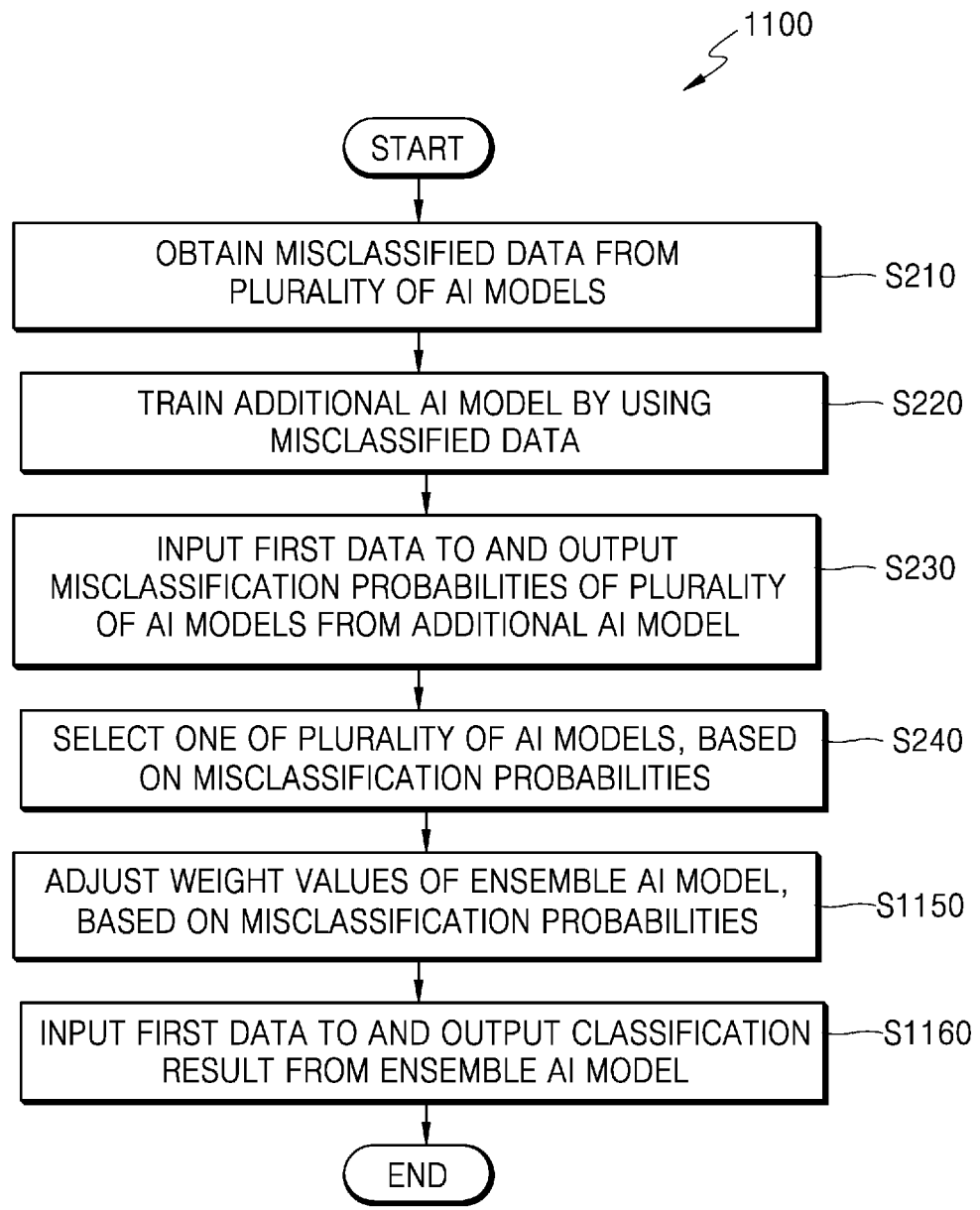
FIG. 11 is a flowchart of a method of selecting an AI model based on input data, according to an embodiment of the disclosure.

FIG. 11 is a flowchart of a method of selecting an AI model based on input data, according to an embodiment of the disclosure. Like reference numerals in FIGS. 2A and 11 denote like elements. Accordingly, redundant descriptions provided above in relation to FIGS. 1 to 9 will not be repeated.

After operation S240, the method 1100 of selecting an AI model based on input data may further include operation S1150 of adjusting, based on the misclassification probabilities, a plurality of weight values applied to the plurality of AI models in an ensemble AI model configured by combining the plurality of AI models.

Herein, the ensemble AI model refers to an AI model configured by combining a plurality of AI models. The plurality of AI models may be combined in a serial, parallel, or serial and parallel manner to configure the ensemble AI model.

Specifically, in operation S1150, the plurality of weight values applied to the plurality of AI models may be adjusted in such a manner that the weight value is reduced when the misclassification probability is high. Specifically, by applying the lowest weight value to an AI model having the highest misclassification probability from among the plurality of AI models, the AI model having the highest misclassification probability in the ensemble AI model may make a small contribution to output data generation. As such, an output accuracy of the ensemble AI model may be increased.

For example, in operation S1150, the plurality of weight values applied to the plurality of AI models may be adjusted in such a manner that the misclassification probabilities corresponding to the plurality of AI models are inversely proportional to the plurality of weight values applied to the plurality of AI models.

As another example, in operation S1150, a misclassification probability greater than a certain threshold value may be extracted from among the misclassification probabilities corresponding to the plurality of AI models, and a weight value of an AI model corresponding to the extracted misclassification probability may be set to be 0. Herein, the AI model to which the weight value of 0 is applied may not contribute to output data generation in the ensemble AI model.

That is, when the misclassification probability is greater than the certain threshold value, it may be determined that the corresponding AI model may not correctly perform AI calculations for generating result data. Therefore, in this case, the weight value may be set to be 0 to prevent the corresponding AI model from contributing to output data generation.

When the adjusted weight values are applied to the plurality of AI models and the ensemble AI model is configured using the applied AI models, a misclassification probability for input data may be reduced and thus accuracy of a result may be increased.

After operation S1150, the method 1100 of selecting an AI model based on input data may further include operation S1160 of inputting the first data to the ensemble AI model having the adjusted weight values and outputting a final classification result corresponding to the first data.

The method 200, 1000, or 1100 of selecting an AI model based on input data, according to an embodiment of the disclosure described above in relation to FIGS. 1A to 11, may be performed by at least one of a display device or a server described below with reference to FIGS. 12 to 19. Like reference numerals in FIGS. 12 to 19 denote like elements.

Specifically, the method 200, 1000, or 1100 of selecting an AI model based on input data, according to an embodiment of the disclosure described above in relation to FIGS. 1A to 11, may be performed by a display device.

The display device may be implemented in various forms, e.g., a mobile phone, a tablet PC, a digital camera, a camcorder, a laptop computer, a desktop computer, an e-book reader, a digital broadcast receiver, a PDA, a PMP, a navigation system, an MP3 player, or a wearable device. The display device may be a stationary display device provided at a fixed location or a portable display device a user may carry, or be a digital broadcast receiver capable of receiving digital broadcast signals.

Figure 12:
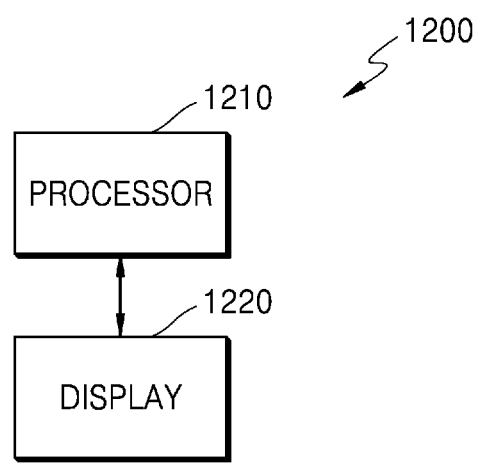
FIG. 12 is a block diagram of a display device according to an embodiment of the disclosure.

FIG. 12 is a block diagram of a display device according to an embodiment of the disclosure.

Referring to FIG. 12, the display device 1200 includes a processor 1210 and a display 1220.

The processor 1210 executes at least one instruction to control the operations of the display device 1200 to be performed. Specifically, the processor 1210 executes at least one instruction to obtain misclassified data corresponding to misclassification results of a training data set when each of a plurality of AI models receives the training data set, classifies the training data set into at least one class, and outputs classification results, obtain an additional trained AI model by training the additional AI model on the misclassified data, input first data to the additional trained AI model and control the additional trained AI model to output misclassification probabilities of the plurality of AI models, and select one of the plurality of AI models, based on the misclassification probabilities.

The processor 1210 may include one or more processors. In this case, the one or more processors may be general-purpose processors such as central processing units (CPUs) or application processors (APs), dedicated graphic processors such as graphic processing units (GPUs), or dedicated AI processors such as neural processing units (NPUs).

Specifically, the processor 1210 may control input data to be processed according to a predefined operation rule or an AI model stored in a memory. The predefined operation rule or the AI model is characterized by being made through training.

Herein, being made through training or being trained means that an AI model having desired characteristics is made by applying a learning algorithm to a plurality of pieces of training data. The training may be made by a device for performing AI calculations according to the disclosure, or through a separate server/system.

Herein, the learning algorithm is a method of training a certain target device (e.g., a robot) by using a plurality of pieces of training data to enable the certain target device to autonomously make a decision or a prediction. The learning algorithm may include supervised learning, unsupervised learning, semi-supervised learning, or reinforcement learning, and is not limited to the above-mentioned examples unless specified herein.

Specifically, the processor 1210 may generate output data corresponding to input data through an AI model for performing calculations through a neural network, which is described above in relation to FIG. 1A. Specifically, the processor 1210 may perform calculations through at least one of the above-described plurality of AI models, the additional AI model, or the ensemble AI model.

The processor 1210 may control operations according to the display device 1200 and control other elements included in the display device 1200, to perform a certain operation.

The display 1220 outputs an image. Specifically, the display 1220 may output an image corresponding to video data, through a display panel included therein, such that a user may visually recognize the video data. In an embodiment of the disclosure, the display 1220 may output a user interface screen including the output data generated by the processor 1210 through the AI model.

Figure 13:
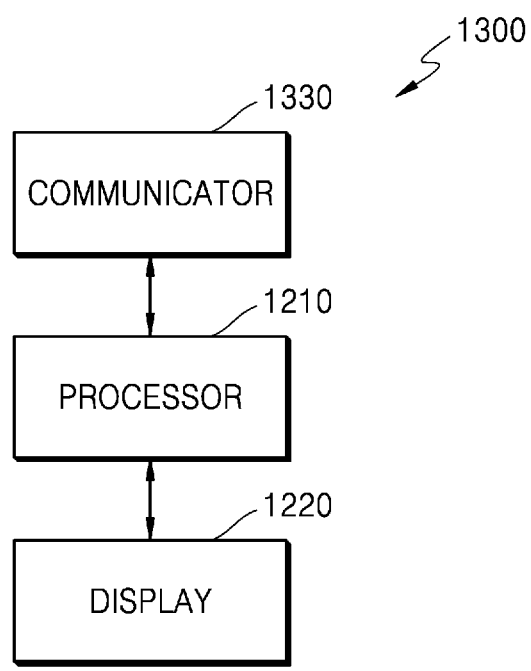
FIG. 13 is a detailed block diagram of a display device according to an embodiment of the disclosure.

FIG. 13 is a detailed block diagram of a display device according to an embodiment of the disclosure.

Referring to FIG. 13, the display device 1300 may correspond to the display device 1200, but may further include a communicator 1330.

The communicator 1330 may transmit data to and receive data from at least one external device through a communication network under the control of the processor 1210. Herein, the external device may be a server, a mobile device, or a physically separate electronic device.

Specifically, the communicator 1330 may include at least one communication module for communicating with the external device in a wired or wireless manner according to one or more wired or wireless communication standards. Specifically, the communicator 1330 may include communication modules for performing communication according to a communication standard, e.g., a Bluetooth communication module, a wireless local area network (WLAN) communication module, and a wired Ethernet communication module. Herein, the WLAN communication module may include a WiFi communication module for performing communication according to the WiFi communication standard.

A case in which the external device for communicating with the display device 1300 is a server will now be described as an example.

Figure 14:
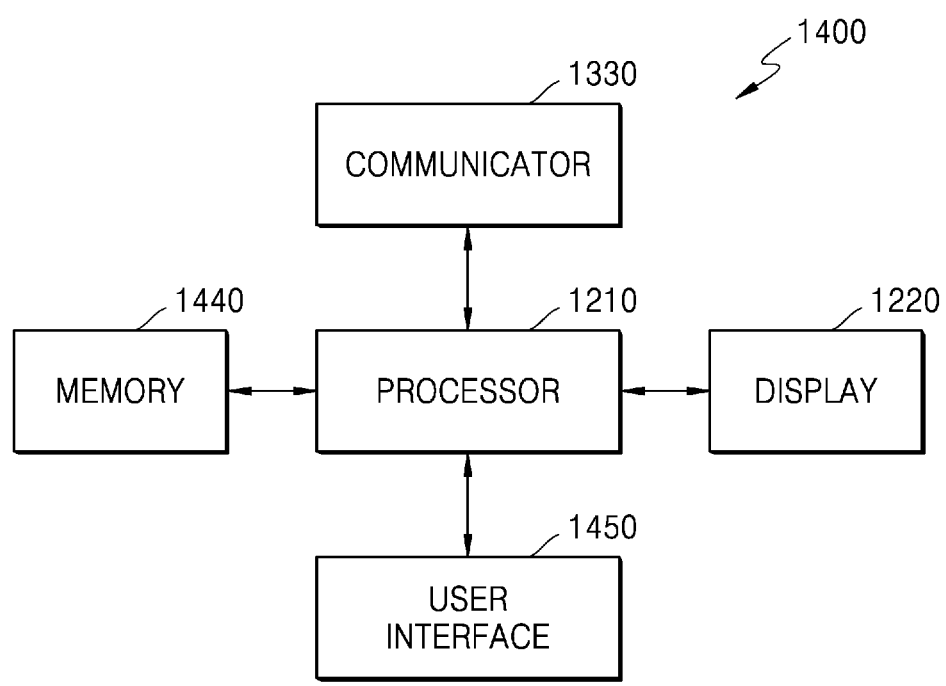
FIG. 14 is a detailed block diagram of a display device according to an embodiment of the disclosure.

FIG. 14 is a detailed block diagram of a display device according to an embodiment of the disclosure.

Referring to FIG. 14, the display device 1400 may correspond to the display devices 1200 or 1300, but may further include at least one of a memory 1440 or a user interface 1450.

The memory 1440 may store at least one instruction. The memory 1440 may store at least one program to be executed by the processor 1210. The memory 1440 may store at least one of the above-described AI models. Specifically, the memory 1440 may store at least one of the above-described plurality of AI models, the additional AI model, or the ensemble AI model.

The memory 1440 may include at least one type of storage medium from among flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, or an optical disc.

The user interface 1450 may receive user input for controlling the display device 1400. The user interface 1450 may include a user input device including, for example, a touch panel for sensing touch input of a user, buttons for receiving push input of the user, a wheel for receiving spinning or scrolling input of the user, a keyboard, or a dome switch, but the user interface 1450 is not limited thereto.

The user interface 1450 may include a voice recognition device for recognizing voice input. For example, the voice recognition device may be a microphone and may receive a voice command or a voice request of the user. As such, the processor 1210 may control an operation corresponding to the voice command or the voice request, to be performed.

The user interface 1450 may include a motion sensor. For example, the motion sensor may detect motion of the display device 1400 and receive the detected motion as user input. The above-described voice recognition device and the motion sensor may not be included in the user interface 1450 and be included in the display device 1400 as a module independent of the user interface 1450.

Figure 15:
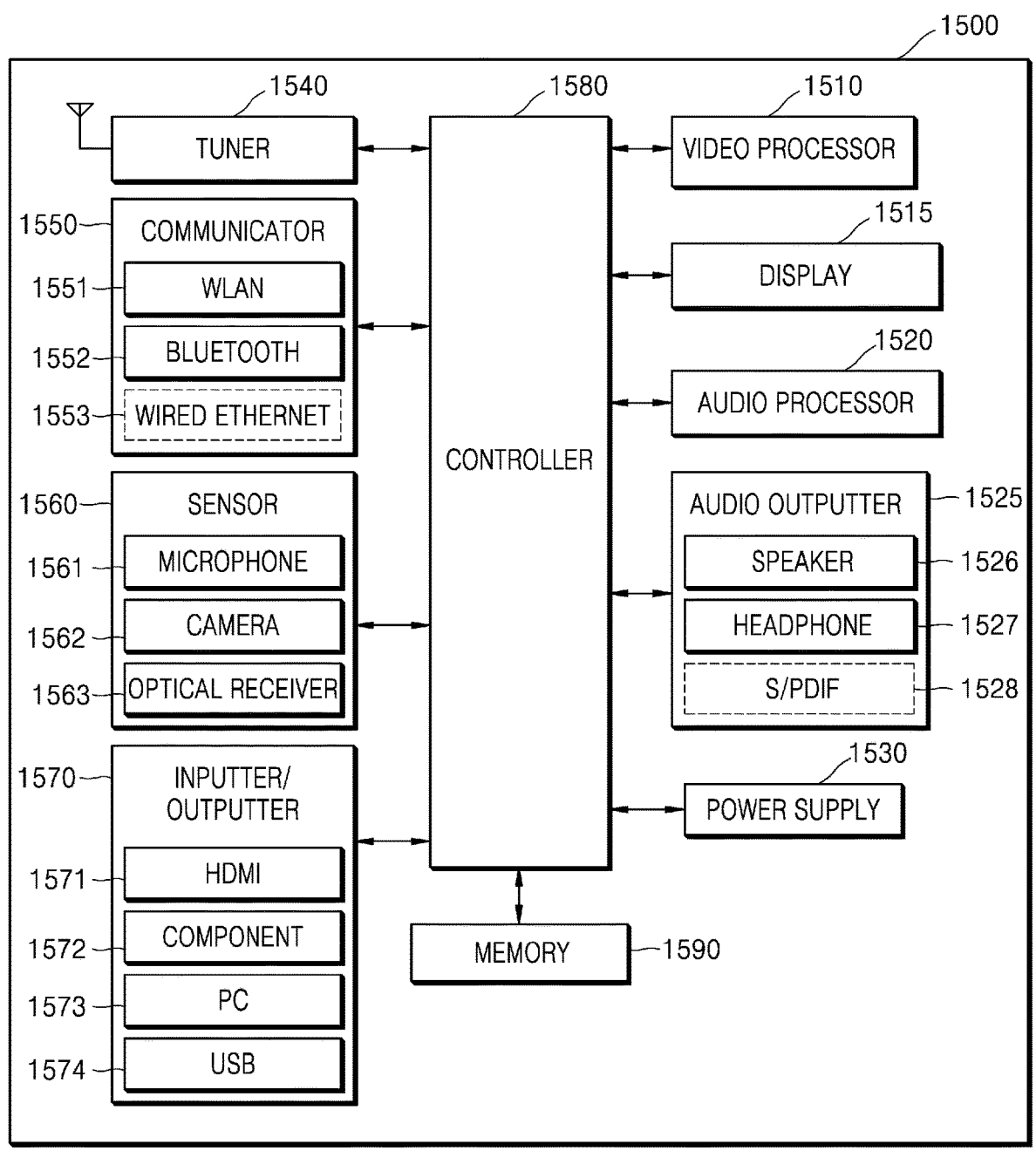
FIG. 15 is a block diagram of a display device according to an embodiment of the disclosure.

FIG. 15 is a block diagram of a display device 1500 according to an embodiment of the disclosure.

The display device 1500 may correspond to the display device 1200, 1300, or 1400 according to an embodiment of the disclosure described above in relation to FIGS. 12 to 14. The method 200, 1000, or 1100 of selecting an AI model based on input data, according to an embodiment of the disclosure described above in relation to FIGS. 1A to 11, may be performed by the display device 1500 illustrated in FIG. 15. Accordingly, redundant descriptions provided above in relation to FIGS. 1A to 14 will not be repeated.

Referring to FIG. 15, the display device 1500 includes a video processor 1510, a display 1515, an audio processor 1520, an audio outputter 1525, a power supply 1530, a tuner 1540, a communicator 1550, a sensor 1560, an inputter/outputter 1570, a controller 1580, and a memory 1590.

Herein, the controller 1580 may correspond to the processor 1210 illustrated in FIG. 12. The communicator 1550, the display 1515, and the memory 1590 of the display device 1500 may respectively correspond to the communicator 1330, the display 1220, and the memory 1440 illustrated in FIG. 14. Therefore, redundant descriptions provided above in relation to the display device 1200, 1300, or 1400 will not be repeated.

The video processor 1510 processes video data received by the display device 1500. The video processor 1510 may perform various types of image processing, e.g., decoding, scaling, noise filtering, frame rate conversion, and resolution conversion, on the video data.

The controller 1580 may receive a request to record the video data processed by the video processor 1510, and control the video data to be coded and recorded in a memory device (e.g., RAM) included in the controller 1580 or the memory 1590.

In an embodiment of the disclosure, at least one processor included in the controller 1580 may execute at least one instruction to control performance of one of operation S210 of obtaining misclassified data corresponding to misclassification results of a training data set when each of a plurality of AI models receives the training data set, classifies the training data set into at least one class, and outputs the classification results, operation S220 of obtaining an additional trained AI model by training the additional AI model on the misclassified data, operation S230 of inputting first data to the additional trained AI model and outputting misclassification probabilities of the plurality of AI models, and operation S240 of selecting one of the plurality of AI models, based on the misclassification probabilities.

The display 1515 displays video data included in a broadcast signal received through the tuner 1540, on a screen under the control of the controller 1580. The display 1515 may display content (e.g., a moving image) input through the communicator 1550 or the inputter/outputter 1570.

The display 1515 may output an image stored in the memory 1590, under the control of the controller 1580. The display 1515 may display a voice user interface (UI) (e.g., a UI including a voice instruction guide) for performing a voice recognition task corresponding to voice recognition, or a motion UI (e.g., a UI including a user motion guide for recognizing motion) for performing a motion recognition task corresponding to motion recognition.

The audio processor 1520 processes audio data. The audio processor 1520 may perform various types of processing, e.g., decoding, amplification, and noise filtering, on the audio data. Meanwhile, the audio processor 1520 may include a plurality of audio processing modules to process audio data corresponding to a plurality of contents.

The audio outputter 1525 outputs audio data included in the broadcast signal received through the tuner 1540, under the control of the controller 1580. The audio outputter 1525 may output audio data (e.g., voice or sound) input through the communicator 1550 or the inputter/outputter 1570. The audio outputter 1525 may output audio data stored in the memory 1590, under the control of the controller 1580. The audio outputter 1525 may include at least one of a speaker 1526, a headphone output terminal 1527, or a Sony/Philips Digital Interface (S/PDIF) output terminal 1528. The audio outputter 1525 may include a combination of the speaker 1526, the headphone output terminal 1527, and the S/PDIF output terminal 1528.

The power supply 1530 supplies power input from an external power source, to the elements 1510 to 1590 in the display device 1500 under the control of the controller 1580. The power supply 1530 may supply power output from one or more batteries located in the display device 1500, to the elements 1510 to 1590 under the control of the controller 1580.

The tuner 1540 may select and be tuned to a frequency of a desired channel to be received by the display device 1500 from among a large number of radio wave components by, for example, amplifying, mixing, and resonating a broadcast signal received in a wired or wireless manner. The broadcast signal includes audio data, video data, and additional information (e.g., an electronic program guide (EPG)).

The tuner 1540 may receive a broadcast signal in a frequency band corresponding to a channel number (e.g., a cable TV channel No. 506) according to user input (e.g., a control signal such as channel number input, channel up-down input, or channel input on an EPG screen) received from an external controller such as a remote controller.

The tuner 1540 may receive broadcast signals from various sources such as terrestrial, cable, satellite, and Internet broadcast providers. The tuner 1540 may receive broadcast signals from sources such as analog and digital broadcast providers. The broadcast signal received through the tuner 1540 is decoded (for example, audio-decoded, video-decoded, or additional-information-decoded) into audio data, video data, and/or additional information. The decoded audio data, video data, and/or additional information may be stored in the memory 1590 under the control of the controller 1580.

The display device 1500 may include one or more tuners 1540. When a plurality of tuners 1540 are included according to an embodiment of the disclosure, a plurality of broadcast signals may be output on a plurality of windows included in a picture-in-picture or a multi-window screen provided on the display 1515.

The tuner 1540 may be included in the display device 1500 as an all-in-one device or be implemented as a separate device electrically connected to the display device 1500 (e.g., a tuner connected to a set-top box and the inputter/outputter 1570).

The communicator 1550 may connect the display device 1500 to an external device (e.g., an audio device) under the control of the controller 1580. The controller 1580 may transmit or receive content to or from, download an application from, or perform web browsing on the external device connected through the communicator 1550. Specifically, the communicator 1550 may access a network and receive content from the external device.

As described above, the communicator 1550 may include at least one of a short-range wireless communication module, a wired communication module, or a mobile communication module.

FIG. 15 illustrates, as an example, a case in which the communicator 1550 includes one of a WLAN communication module 1551, a Bluetooth communication module 1552, and a wired Ethernet communication module 1553.

The communicator 1550 may include a combination of two or more of the WLAN communication module 1551, the Bluetooth communication module 1552, and a wired Ethernet communication module 1553. The communicator 1550 may receive a control signal of the external controller under the control of the controller 1580. The control signal may be implemented in a Bluetooth type, a radio frequency (RF) signal type, or a Wi-Fi type.

The communicator 1550 may further include a non-Bluetooth short-range wireless communication module (e.g., a near field communication (NFC) module) and a separate Bluetooth low energy (BLE) module.

The sensor 1560 detects voice of a user, an image of the user, or interaction of the user.

A microphone 1561 receives voice uttered by the user. The microphone 1561 may convert the received voice into an electrical signal and output the electrical signal to the controller 1580. The voice of the user may include, for example, voice corresponding to a menu or a function of the display device 1500. For example, a recognition range of the microphone 1561 is recommended within a distance of 4 meters from the microphone 1561 to the location of the user, and may vary depending on a voice volume of the user and an ambient environment (e.g., a speaker volume and ambient noise).

The microphone 1561 may be integrated with or separate from the display device 1500. The separate microphone 1561 may be electrically connected to the display device 1500 through the communicator 1550 or the inputter/outputter 1570.

It will be easily understood by one of ordinary skill in the art that the microphone 1561 may be excluded depending on the performance and structure of the display device 1500.

A camera 1562 receives an image (e.g., consecutive frames) corresponding to motion (including a gesture) of the user in a recognition range of the camera 1562. For example, the recognition range of the camera 1562 may be within a distance of 0.1 meters to 5 meters from the camera 1562 to the user. The motion of the user may include, for example, a gesture or motion of a body part of the user, e.g., the face, a hand, a fist, or a finger. The camera 1562 may convert the received image into an electrical signal and output the electrical signal to the controller 1580 under the control of the controller 1580.

The controller 1580 may select a menu displayed on the display device 1500 or perform a control operation by using the received motion recognition result. For example, the controller 1580 may switch channels, control a volume, or move an indicator.

The camera 1562 may include a lens and an image sensor. The camera 1562 may support optical zoom or digital zoom by using a plurality of lenses and image processing. The recognition range of the camera 1562 may be variously set depending on an angle of the camera 1562 and an ambient environment. When the camera 1562 includes a plurality of cameras, a 3-dimensional still image or a 3-dimensional motion may be received using the plurality of cameras.

The camera 1562 may be integrated with or separate from the display device 1500. A device including the separate camera 1562 may be electrically connected to the display device 1500 through the communicator 1550 or the inputter/outputter 1570.

It will be easily understood by one of ordinary skill in the art that the camera 1562 may be excluded depending on the performance and structure of the display device 1500.

An optical receiver 1563 receives an optical signal (including a control signal) from the external controller through, for example, an optical window of a bezel of the display 1515. The optical receiver 1563 may receive, from the external controller, an optical signal corresponding to user input (e.g., touch, push, a touch gesture, voice, or motion). A control signal may be extracted from the received optical signal under the control of the controller 1580.

For example, the optical receiver 1563 may receive a signal corresponding to a pointing location of the external controller and transmit the signal to the controller 1580. For example, when a UI screen for receiving data or a command from the user is output on the display 1515 and the user desires to input data or a command to the display device 1500 through the external controller, and when the user moves the external controller while touching a finger on a touchpad provided on the external controller, the optical receiver 1563 may receive a signal corresponding to the motion of the external controller and transmit the signal to the controller 1580. The optical receiver 1563 may receive a signal indicating that a specific button provided on the external controller is pressed and transmit the signal to the controller 1580. For example, when the user presses, with a finger, a button-type touchpad provided on the external controller, the optical receiver 1563 may receive a signal indicating that the button-type touchpad is pressed and transmit the signal to the controller 1580. For example, the signal indicating that the button-type touchpad is pressed may be used as a signal for selecting one of items.

The inputter/outputter 1570 may be one or more input/output interfaces that receives, for example, video data (e.g., a moving image), audio data (e.g., voice or music), and additional information (e.g., an EPG) from outside the display device 1500 under the control of the controller 1580. The inputter/outputter 1570 may include at least one of a high-definition multimedia interface (HDMI) port 1571, a component jack 1572, a PC port 1573, or a universal serial bus (USB) port 1574. The inputter/outputter 1570 may include a combination of the HDMI port 1571, the component jack 1572, the PC port 1573, and the USB port 1574.

It will be easily understood by one of ordinary skill in the art that the configuration and operation of the inputter/outputter 1570 may be implemented in various manners according to an embodiment of the disclosure.

The controller 1580 controls overall operations of the display device 1500 and signal flows between the elements of the display device 1500, and processes data. When user input is received or a preset condition is satisfied, the controller 1580 may execute an operating system (OS) and various applications stored in the memory 1590.

The controller 1580 may include RAM storing signals or data input from outside the display device 1500 or used as a storage space for various operations according to the display device 1500, ROM storing a control program for controlling the display device 1500, and a processor.

The processor may include a GPU for processing graphics corresponding to video data. The processor may be implemented as an SOC in which a core is integrated with a GPU. The processor may include a single core, dual cores, triple cores, quad cores, or multiple cores thereof.

The processor may include a plurality of processors. For example, the processor may include a main processor and a sub-processor operating in a sleep mode.

The GPU generates a screen including various objects such as icons, images, and text by using a calculator and a renderer. The calculator calculates attribute values such as a coordinate, a shape, a size, and a color of each object to be displayed, based on a screen layout by using user interaction sensed by the sensor 1560. The renderer generates a screen of various layouts including objects, based on the attribute values calculated by the calculator. The screen generated by the renderer is displayed in a display area of the display 1515.

Figure 16:
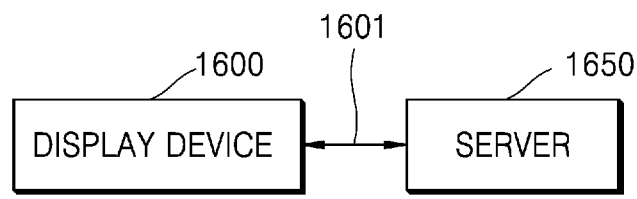
FIG. 16 is a block diagram of a system for selecting an AI model based on input data, according to an embodiment of the disclosure.

FIG. 16 is a block diagram of a system for performing a method of selecting an AI model based on input data, according to an embodiment of the disclosure.

Referring to FIG. 16, the method 200, 1000, or 1100 of selecting an AI model based on input data, according to an embodiment of the disclosure described above in relation to FIGS. 1A to 11, may be according to the display device 1600 and the server 1650 of the system illustrated in FIG. 16.

Herein, the display device 1600 may correspond to the display device 1200, 1300, 1400, or 1500 according to an embodiment of the disclosure described above in relation to FIGS. 12 to 15. The display device 1600 may be connected to the server 1650 through a communication network 1601, and access the communication network 1601 through a communicator included therein (e.g., the communicator 1330 illustrated in FIGS. 13 and 14).

The server 1650 may perform calculations based on a neural network. The display device 1600 and the server 1650 may transmit and receive the result of performing calculations based on the neural network, an AI model obtained by training the neural network, data required to train the AI model, and data required to output a result of the AI model.

The AI model installed in the display device 1600 illustrated in FIG. 16 may be an on-device AI model as described above in relation to FIG. 9, and the AI model installed in the server 1650 may be a server-based AI model.

Operations according to the display device 1600 and the server 1650 will now be described in detail with reference to FIGS. 17 to 19. Like reference numerals in FIGS. 16 to 19 denote like elements.

Figure 17:
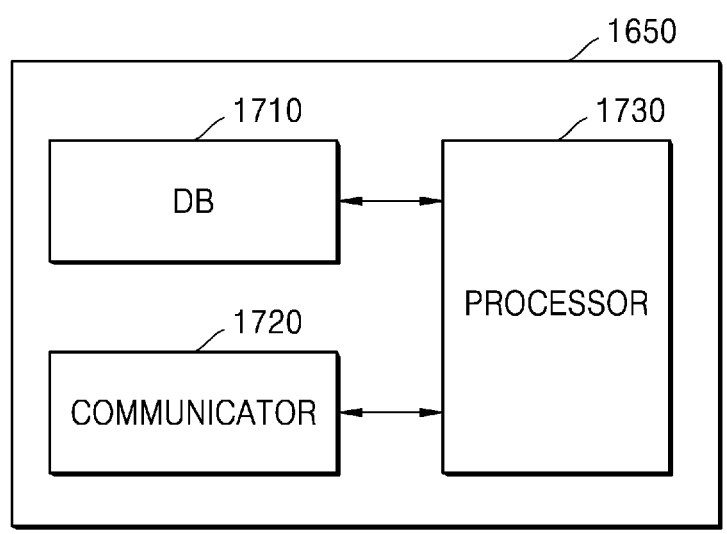
FIG. 17 is a detailed block diagram of the server illustrated in FIG. 16.

FIG. 17 is a detailed block diagram of the server illustrated in FIG. 16.

Referring to FIG. 17, the server 1650 according to an embodiment of the disclosure may include a database (DB) 1710, a communicator 1720, and a processor 1730. The server 1650 may operate in association with a display device according to an embodiment of the disclosure and perform at least one of input data analyzation, object recognition, object classification, or result data outputting by performing calculations based on a neural network.

The DB 1710 may include a memory and store, in the memory, at least one of at least one instruction, programs, or data required when the server 1650 performs a certain operation.

The DB 1710 may store data required when the server 1650 performs calculations based on the neural network. Specifically, the DB 1710 may store a training data set (e.g., see reference numeral 300 of FIG. 3) required to train an AI model. The DB 1710 may store a plurality of AI models. The DB 1710 may store the misclassified data obtained in operation S210. The DB 1710 may store an additional AI model and store an additional trained AI model obtained by training the additional AI model on the misclassified data.

The communicator 1720 may include one or more elements for communicating with the display device 1600. A detailed configuration of the communicator 1720 equally corresponds to the configuration of the communicator 1330 described above in relation to FIG. 13, and thus a detailed description thereof is not provided herein.

The processor 1730 controls overall operations of the server 1650. For example, the processor 1730 may execute the programs stored in the DB 1710 of the server 1650, to control the DB 1710 and the communicator 1720. The processor 1730 may execute the programs stored in the DB 1710, to perform some of the operations of the display device 1200, 1300, 1400, 1500, or 1600 of FIGS. 12 to 16.

The processor 1730 may perform an operation of training an AI model, an operation of outputting a result of the AI model, an operation required to transmit the output result from the AI model to the display device 1600, or an operation required to transmit and receive data to and from the display device 1600.

Operations according to the server 1650 and the display device 1600 will now be described in detail with reference to FIGS. 18 and 19. Like reference numerals in FIGS. 16 to 19 denote like elements.

Figure 18:
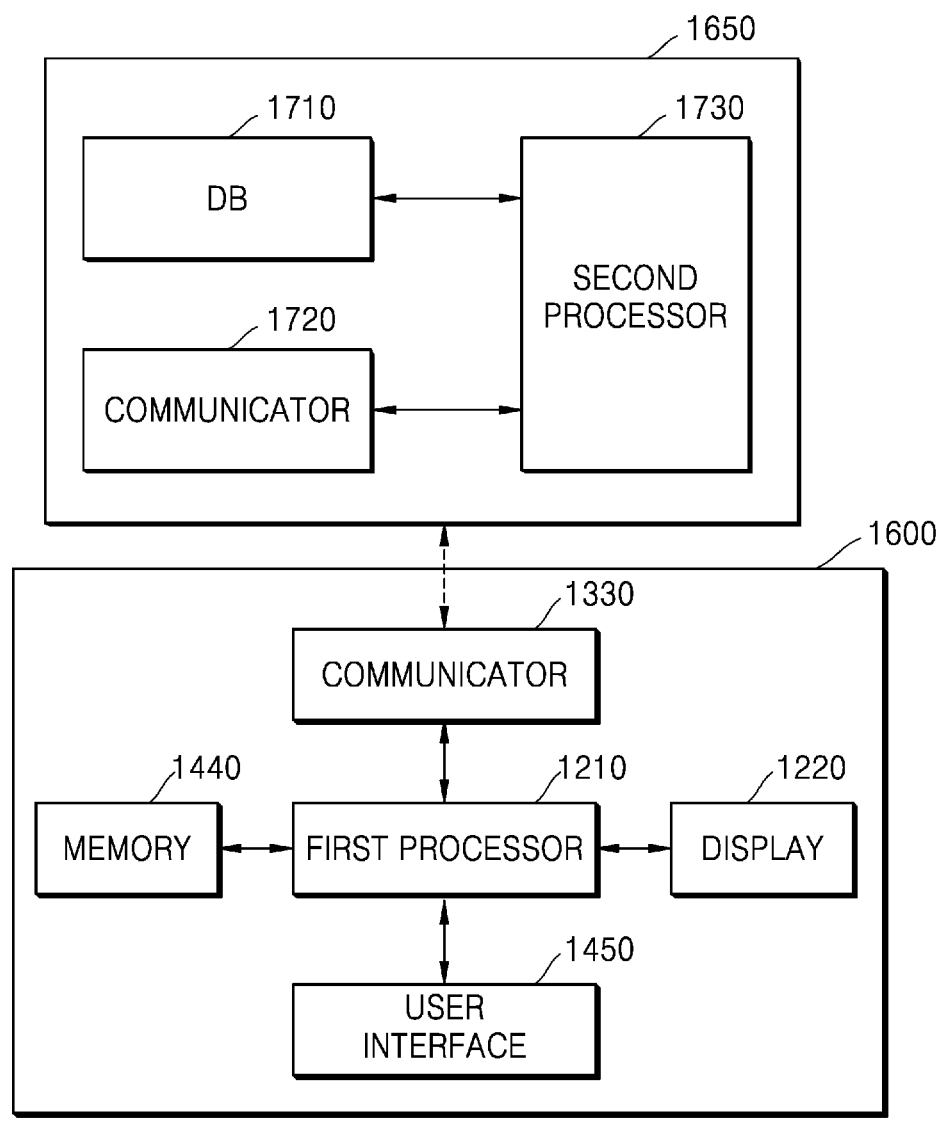
FIG. 18 is a block diagram of the display device illustrated in FIG. 16.

FIG. 18 is a block diagram of the display device for communicating with the server.

Figure 19:
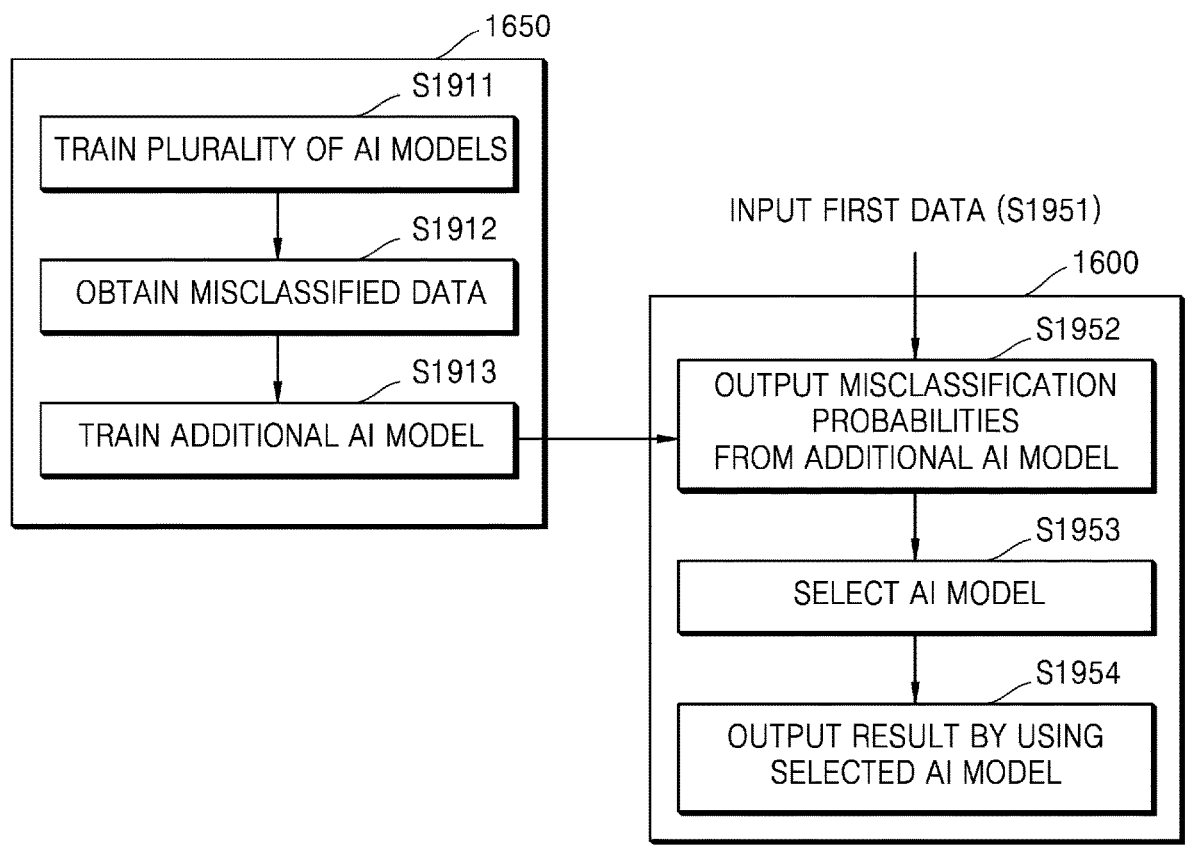
FIG. 19 is a diagram illustrating operations of the server and the display device illustrated in FIG. 16.

FIG. 19 is a diagram illustrating operations according to the server 1650 and the display device 1600 illustrated in FIG. 16. Specifically, FIG. 19 illustrates operations according to the server 1650 and operations according to the display device 1600 by using flowcharts.

In FIG. 18, for convenience of explanation, the processor 1210 included in the display device 1600 is called a 'first processor' and the processor 1730 included in the server 1650 is called a 'second processor.'

Referring to FIGS. 18 and 19, the method 200, 1000, or 1100 of selecting an AI model based on input data, according to an or another embodiment of the disclosure described above in relation to FIGS. 1A to 11, may be performed by the display device 1600 and the server 1650.

Specifically, the DB 1710 may store a training data set (e.g., the training data set 300 illustrated in FIG. 3) and a plurality of AI models.

Referring to FIGS. 18 and 19, the second processor 1730 may execute at least one instruction to train each of the plurality of AI models by using the training data set (e.g., see reference numeral 300) stored in the DB 1710 (operation S1911). Herein, operation S1911 corresponds to operation S1005 described above in relation to FIG. 10, and thus a redundant description thereof is not provided. As a result of performing operation S1911, the second processor 1730 may obtain misclassified data (operation S1912). Herein, operation S1912 corresponds to operation S210 described above in relation to FIG. 2A, and thus a redundant description thereof is not provided. The obtained misclassified data may be stored in the DB 1710 under the control of the second processor 1730.

The DB 1710 may store an additional AI model. Herein, the DB 1710 may store both of an additional AI model before being trained and an additional AI model after being trained.

Subsequently, the second processor 1730 executes at least one instruction to train the additional AI model by using the misclassified data stored in the DB 1710 (operation S1913). Herein, operation S1913 corresponds to operation S220 described above in relation to FIG. 2A, and thus a redundant description thereof is not provided.

In general, a wide variety of AI models may be present and the training data set needs to be configured as a set of a large number of data for training. Therefore, the plurality of AI models and the training data set may be stored in and processed by the server 1650 having a large storage capacity. Therefore, the operation of training the plurality of AI models may be according to the server 1650 connected to the display device 1600 through the communication network 1601.

The display device 1600 may receive the additional trained AI model from the server 1650. Specifically, under the control of the first processor 1210, the communicator 1330 may receive the additional trained AI model through the communicator 1720 of the server 1650 in operation S1913. The first processor 1210 may store the received additional AI model in the memory 1440.

The first processor 1210 may input first data to the additional AI model (operation S1951) and output misclassification probabilities of the plurality of AI models (operation S1952). Herein, operation S1952 equally corresponds to operation S230 described above in relation to FIG. 2A, and thus a detailed description thereof is not provided herein.

The first processor 1210 selects one of the plurality of AI models mentioned above in operation S1911, based on the misclassification probabilities obtained in operation S1952 (operation S1953). Herein, operation S1953 corresponds to operation S240 described above in relation to FIG. 2A, and thus a redundant description thereof is not provided.

Subsequently, the first processor 1210 may output a result corresponding to the first data, by using the AI model selected in operation S1953 (operation S1954). Herein, operation S1954 corresponds to operation S1050 described above in relation to FIG. 10, and thus a redundant description thereof is not provided.

That is, in FIG. 19, the plurality of AI models trained on the training data set in operation S1911 may be server-based AI models. The additional AI model of operation S1913 may also be a server-based AI model. The additional AI model trained in operation S1913 and transmitted to the display device 1600 may be received by and stored in the display device 1600 and then operate as an on-device AI model.

In general, the display device 1600 may have lower memory capacity, calculation speed, and training data set collection capability compared to the server 1650. Therefore, an operation which requires a large data storage and a large calculation amount may be according to the server 1650, and then required data and AI model may be transmitted through the communication network 1601 to the display device 1600. Then, the display device 1600 may rapidly and easily perform a required operation without a large-capacity memory and a high-speed processor by receiving and using required data and AI model from the server 1650.

Although FIG. 19 illustrates, as an example, a case in which operation S1911 of training the plurality of AI models, operation S1912 of obtaining the misclassified data, and operation S1913 of training the additional AI model are according to the server 1650, the server 1650 may additionally perform at least one of operation S1952 of outputting the misclassification probabilities, operation S1953 of selecting the AI model, or operation S1954 of outputting the result. In this case, the server 1650 may transmit data corresponding to the result of performance, to the display device 1600.

Although FIG. 19 illustrates, as an example, a case in which operation S1952 of outputting the misclassification probabilities, operation S1953 of selecting the AI model, and operation S1954 of outputting the result are according to the display device 1600, the display device 1600 may additionally perform at least one of operation S1911 of training the plurality of AI models, operation S1912 of obtaining the misclassified data, or operation S1913 of training the additional AI model are according to the server 1650.

Depending on design specifications, data processing capacities, memory capacities, data processing speeds, etc. of the display device 1600 and the server 1650, operations included in a method of selecting an AI model based on input data, according to an embodiment of the disclosure, may be determined to be according to the display device 1600 or the server 1650. For example, an operation which uses large-capacity data and requires rapid data processing may be according to the server 1650, and a simple calculation operation or an operation which requires security may be according to the display device 1600.

A method of selecting an AI model based on input data, according to an embodiment of the disclosure, may be implemented in the form of program instructions that can be executed through various computer means, and may be recorded in a computer-readable recording medium. An embodiment of the disclosure may be implemented in the form of a computer-readable recording medium having recorded thereon one or more programs including instructions for executing the method of selecting an AI model based on input data.

The computer-readable recording medium may store program instructions, data files, data structures, or combinations thereof. The instructions commands recorded on the computer-readable recording medium may be those specially designed and constructed for the purposes of the disclosure, or they may be of the kind well known and available to one of ordinary skill in the art of computer software. Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, or flash memories, etc.) that are specially configured to store and execute program commands. Examples of the program instructions include both machine code, such as produced by a compiler, and high-level language code that may be executed by the computer using an interpreter.

The method of selecting an AI model based on input data, according to an or another embodiment of the disclosure, may be implemented in the form of a computer program product including a recording medium having recorded thereon a program configured to perform an operation of obtaining a multilingual sentence, and an operation of obtaining vector values respectively corresponding to words included in the multilingual sentence, by using a multilingual translation model, converting the obtained vector values into vector values corresponding to a target language, and obtaining a sentence of the target language based on the converted vector values.

In a method of selecting an AI model based on input data, a display device for performing the method, and a computer program product for performing the method, according to an embodiment of the disclosure, an AI model optimized to process input data may be automatically selected from among a plurality of AI models.

As such, accuracy of an output result output as a result of calculations performed by the AI model may be increased.

While one or more embodiments of the disclosure have been described with reference to the figures, it will be understood by one of ordinary skill in the art that various changes in form and details may be made therein without departing from the scope of the disclosure as defined by the following claims.

What is claimed is:

1. A method of selecting an artificial intelligence model for classifying input data, the method comprising:
   obtaining first misclassified data of a first artificial intelligence model classifying data included in a training data set, the first misclassified data indicating data misclassified by the first artificial intelligence model from the training data set misclassified data corresponding to misclassification results of a training data set;
   obtaining second misclassified data of a second artificial intelligence model classifying the data included in the training data set, the second misclassified data indicating data misclassified by the second artificial intelligence model from the training data set misclassified data corresponding to misclassification results of a training data set;
   training a selection artificial intelligence model based on the first misclassified data and the second misclassified data;
   outputting a first misclassification probability of the first artificial intelligence model incorrectly classifying input data and a second misclassification probability of the second artificial intelligence model incorrectly classifying the input data, in response to the input data being received in the trained selection artificial intelligence model; and
   selecting an optimal artificial intelligence model for the input data from among the first artificial intelligence model and the second artificial intelligence model based on the first misclassification probability and the second misclassification probability.

2. The method of claim 1, wherein the selecting comprises selecting the optimal artificial intelligence model corresponding to a lowest value of misclassification probability of incorrectly classifying the input data determined by the selection artificial intelligence model from among the first misclassification probability and the second misclassification probability.

3. The method of claim 1, wherein the training comprises:
   inputting the first misclassified data and the second misclassified data to the selection artificial intelligence model.

4. The method of claim 3, wherein the training comprises training the selection artificial intelligence model about characteristics and distribution of data of the first data and the second data.

5. The method of claim 1, further comprising:
   providing the input data to the optimal artificial intelligence model; and
   obtaining a result of classifying the input data from the optimal artificial intelligence model.

6. The method of claim 1, wherein a neural network structure of the selection artificial intelligence model is different from structures of the first artificial intelligence model and the second artificial intelligence model.

7. The method of claim 1, further comprising adjusting, based on the first misclassification probability and the second misclassification probability, a plurality of weight values applied to at least one of the first artificial intelligence model and the second artificial intelligence model comprising an ensemble artificial intelligence model.

8. The method of claim 7, wherein the adjusting of the plurality of weight values comprises adjusting the plurality of weight values applied to at least one of the first artificial intelligence model and the second artificial intelligence model, in such a manner that the plurality of weight values are reduced when misclassification probability is high.

9. The method of claim 7, further comprising:
   providing the input data to the ensemble artificial intelligence model; and
   outputting a result of classifying the input data from the ensemble artificial intelligence model.

10. The method of claim 1, wherein the first artificial intelligence model is configured to classify the input data into a class from among a plurality of classes and the second artificial intelligence model is configured to classify the input data into the class from among the plurality of classes.

11. The method of claim 1, wherein at least one of a first hyper-parameter, a first model architecture, a first training technique, or a first dataset input for training the first artificial intelligence model is different from at least one of a second hyper-parameter, a second model architecture, a second training technique, or a second dataset input for training the second artificial intelligence model.

12. The method of claim 1, wherein the first artificial intelligence model and the second artificial intelligence model are combined as an ensemble AI model configured to classify the input data.

13. The method of claim 1, wherein the first artificial intelligence model comprises at least one on-device artificial intelligence model and at least one server-based artificial intelligence model.

14. A device for selecting an artificial intelligence model for classifying input data, the device comprising:
   a display; and
   a processor configured to execute at least one instruction to:
      obtain first misclassified data of a first artificial intelligence model classifying data included in a training data set, the first misclassified data indicating data misclassified by the first artificial intelligence model from the training data set misclassified data corresponding to misclassification results of a training data set;
obtain second misclassified data of a second artificial intelligence model classifying the data included in the training data set, the second misclassified data indicating data misclassified by the second artificial intelligence model from the training data set misclassified data corresponding to misclassification results of a training data set;
train a selection artificial intelligence model based on the first misclassified data and the second misclassified data;
output a first misclassification probability of the first artificial intelligence model incorrectly classifying input data and a second misclassification probability of the second artificial intelligence model incorrectly classifying the input data, in response to the input data being received in the trained selection artificial intelligence model; and
select an optimal artificial intelligence model for the input data from among the first artificial intelligence model and the second artificial intelligence model based on the first misclassification probability and the second misclassification probability.

15. The device of claim 14, wherein the processor is further configured to select the optimal artificial intelligence model corresponding to a lowest value of misclassification probability of incorrectly classifying the input data determined by the selection artificial intelligence model from among the first misclassification probability and the second misclassification probability.

16. The device of claim 14, wherein the processor is further configured to input the first misclassified data and the second misclassified data to the selection artificial intelligence model.

17. The device of claim 14, wherein the first artificial intelligence model is configured to classify the input data into a class from among a plurality of classes and the second artificial intelligence model is configured to classify the input data into the class from among the plurality of classes.

18. The device of claim 14, further comprising a communicator configured to communicate with a server,
wherein the processor is further configured to control the communicator to receive the first misclassified data and the second misclassified data from the server.

19. A non-transitory computer-readable recording medium having recorded thereon a computer program for executing a method of selecting an artificial intelligence model for classifying input data, the method comprising:
obtaining first misclassified data of a first artificial intelligence model classifying data included in a training data set, the first misclassified data indicating data misclassified by the first artificial intelligence model from the training data set misclassified data corresponding to misclassification results of a training data set;
obtaining second misclassified data of a second artificial intelligence model classifying of the data included in the training data set, the second misclassified data indicating data misclassified by the second artificial intelligence model from the training data set misclassified data corresponding to misclassification results of a training data set;
training a selection artificial intelligence model based on the first misclassified data and the second misclassified data;
outputting a first misclassification probability of the first artificial intelligence model incorrectly classifying input data and a second misclassification probability of the second artificial intelligence model incorrectly classifying the input data, in response to the input data being received in the trained selection artificial intelligence model; and
selecting an optimal artificial intelligence model for the input data from among the first artificial intelligence model and the second artificial intelligence model based on the first misclassification probability and the second misclassification probability.

\* \* \* \* \*